United States Patent
Inoue et al.

[11] Patent Number: 5,850,253
[45] Date of Patent: Dec. 15, 1998

[54] APPARATUS FOR REPRODUCING PHOTOGRAPHED IMAGES

[75] Inventors: Manabu Inoue, Kobe; Hirokazu Yagura, Sakai; Katsuyuki Nanba, Sakai; Tsutomu Honda, Sakai; Toru Ishii, Hirakata; Hideki Nagata, Sakai; Hiroaki Kubo, Muko; Gen Sasaki, Toyonaka, all of Japan

[73] Assignee: Minolta Co., Ltd., Osaka, Japan

[21] Appl. No.: 988,724

[22] Filed: Dec. 11, 1997

Related U.S. Application Data

[62] Division of Ser. No. 797,130, Feb. 10, 1997, Pat. No. 5,729,284, which is a division of Ser. No. 394,760, Feb. 27, 1995, Pat. No. 5,623,303.

[30] Foreign Application Priority Data

| Feb. 28, 1994 | [JP] | Japan | 6-030547 |
| Feb. 28, 1994 | [JP] | Japan | 6-030560 |
| Feb. 28, 1994 | [JP] | Japan | 6-030588 |
| Mar. 14, 1994 | [JP] | Japan | 6-042665 |

[51] Int. Cl.⁶ ................................ H04N 5/253
[52] U.S. Cl. ............... 348/96; 348/221; 348/364
[58] Field of Search ............ 348/96, 221, 363, 348/364; H04N 5/253

[56] References Cited

U.S. PATENT DOCUMENTS

| 4,482,924 | 11/1984 | Brownstein | 358/302 |
| 5,541,644 | 7/1996 | Nanba | 348/96 |
| 5,623,303 | 4/1997 | Inoue | 348/96 |
| 5,659,354 | 8/1997 | Oosaka | 348/96 |

FOREIGN PATENT DOCUMENTS

| 0536755 | 4/1993 | European Pat. Off. |
| 0581241 | 2/1994 | European Pat. Off. |
| 9205469 | 4/1992 | WIPO. |

Primary Examiner—Howard Britton
Attorney, Agent, or Firm—Sidley & Austin

[57] ABSTRACT

An apparatus for reproducing images recorded on successive frames of a film recorded with information, the apparatus includes a film feeder which feeds the film in a first direction and a second direction opposite to the first direction; an information reader which reads the recorded information; a density detector which detects a density of each image; and a controller which controls the film feeder, information reader, and density detector. The information reader is worked when the film is fed in the first direction, the density detector is worked when the film is fed in the second direction. A detected image density is adapted for determining an exposure value at which each image is picked up to reproduce the image.

18 Claims, 24 Drawing Sheets

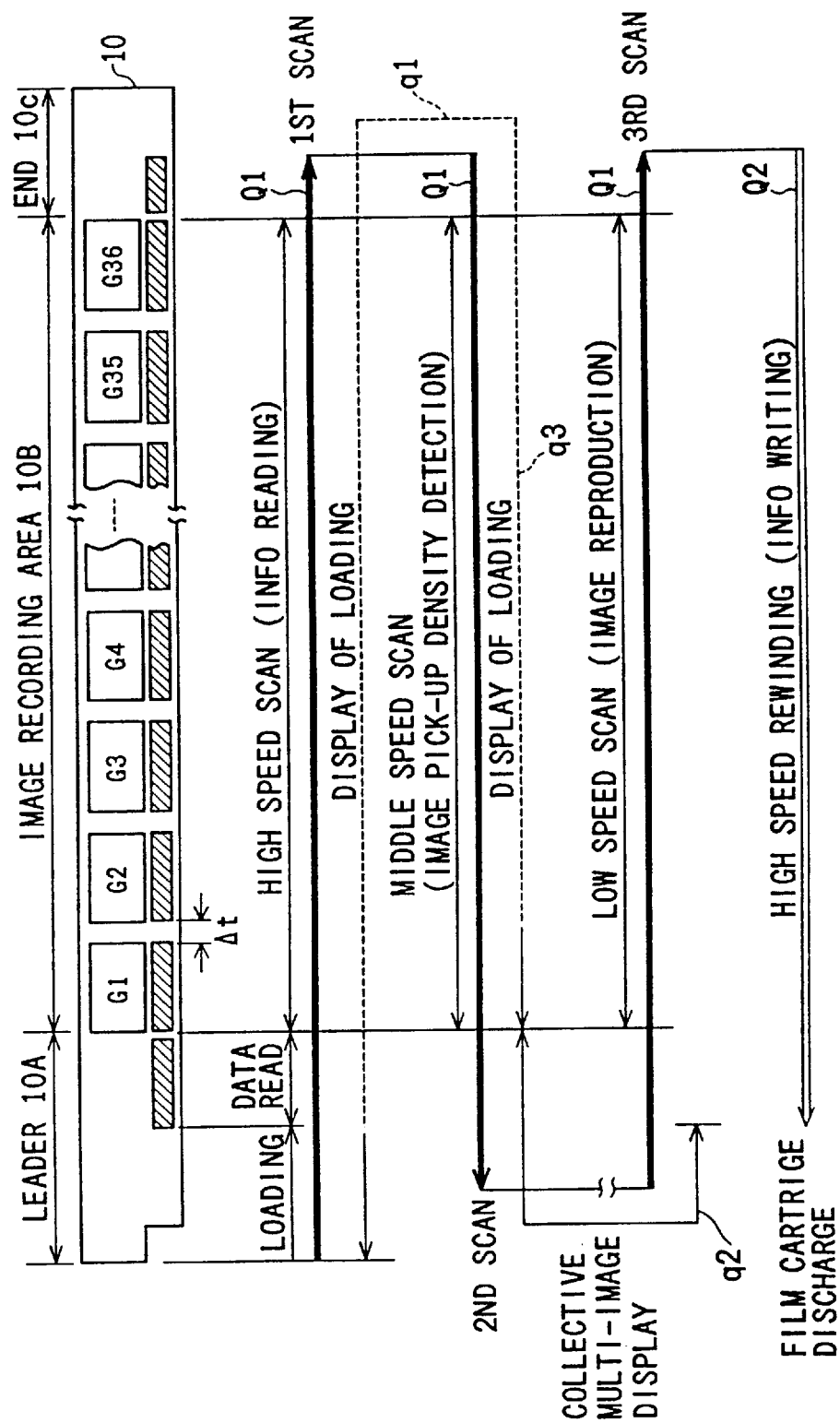

FIG. 20A

| G1 | G2 | G3 | G4 | G5 | G6 |
|----|----|----|----|----|----|
| G7 | G8 | G9 |    |    |    |
|    |    |    |    |    |    |
|    |    |    |    |    |    |

FIG. 20B

| G1 | G2 | G3 | G4 | G5 | G6 |
|----|----|----|----|----|----|
|    |    |    |    |    |    |
|    |    |    |    |    |    |
|    |    |    |    |    |    |

APPARATUS FOR REPRODUCING PHOTOGRAPHED IMAGES

RELATED APPLICATION

This is a division of patent application Ser. No. 08/797,130, now U.S. Pat. No. 5,729,284, filed Feb. 10, 1997 as a division of then copending patent application Ser. No. 08/394,760, now U.S. Pat. No. 5,623,303, filed Feb. 27, 1995.

BACKGROUND OF THE INVENTION

This invention relates to an apparatus for reproducing images recorded in respective frames of a developed film on a display device such as a monitor television.

There have been reproducing apparatuses which reproduce images recorded in respective frames of a developed film (hereinafter referred to as film images) on a monitor TV. The developed film is magnetically recorded with information regarding photographing conditions, developing conditions, reproducing conditions on specified portions. The magnetic information is read by a magnetic sensor. The film images are picked up by a color image sensor such as a CCD (Charge Coupled Device). After white balance correction, γ correction, and other specified image processing, the picked up images are converted into a television signal of, e.g., NTSC system, and displayed on the monitor TV in accordance with reproducing conditions of the read magnetic information.

Further, the technology has been known of providing such reproducing apparatus with function of displaying a so-called multi-image in which all the film images are arranged in a specified pattern on a display screen of a monitor TV to enable the operator to check all the film images at a single screen. However, a long time has been spent until a multi-image is displayed on the display screen because it is necessary to read several kinds of information from the film, specifically, photographing condition information, developing condition information, reproducing condition information, and pick up film images at different speeds. Also, it will be apparent that the greater the number of film images, the longer the generating time of multi-image will become. In view thereof, there has been a big demand of displaying a multi-image in a shorter time after loading film on a reproducing apparatus.

Further, there has been a demand of viewing and seeing a clear multi-image and film image. To display the multi-image and reproduce film images clearly, it is necessary to pick up each film image at its suitable exposure control values. To set the exposure control values suitable for each film image, it is preferable to know an actual density of each film image on the loaded film, and calculate suitable exposure control values based on the image density in addition to the photographing condition and developing information. However, there has not yet been proposed any apparatus capable of detecting an actual density of film image before picking up of film images.

The photographing, developing, and reproducing condition information are recorded in the form of magnetic information. The magnetic information is written or recorded by the alternating current biasing method to reduce signal distortion which is otherwise likely to occur due to magnetic hysteresis. Accordingly, the developed film must be fed at a high speed to assure accurate reading of the magnetic information.

However, the picking up of film images for generation of multi-image and reproduction of film image cannot be executed at the same high speed as the reading of magnetic information. The picking up of film image for generation of multi-image can be executed at a higher speed than the picking up of film image for reproduction of film image because the display of multi-image need not have as high a quality as the reproduction of film image. However, the picking up of film image for multi-image cannot be executed at the same speed as the reading of magnetic information. Accordingly, the reading of magnetic information and picking up of film image must be executed at two different speeds, which will increase the processing time for generation of multi-image and reproduction of film image. Further, if detection of actual image density is executed, the processing time will further become longer.

Further, there has been the following problem in the reproduction of film images. In the processing of images picked up by a color sensor, an image signal representing the picked up image is processed without saturating its level even when a density range of an object is wide. Accordingly, a range of processable signal level is set relatively wide. When an object image having a narrow density range is picked up, a resolving power (dynamic range) of the signal level becomes relatively low, thereby relatively reducing the quality of the picked up image.

The developed color film assumes oranges and has a specified density level, even when it is not exposed. The film image in each frame has a density level according to a content of the image in addition to the orange density level, and a density distribution thereof includes an orange density distribution as a base. The orange base density differs depending upon the kind of film and development conditions, and varies among developed films.

Since the image picked up from the film image has an orange density level independently from the content of the image, the dynamic range becomes, in substance, narrow by the base density level in the image processing, thereby reducing the resolving power of the image.

Particularly, when the density range in the image processing is fixedly set, it is set relatively wide in view of the variation in the base density of the film and a margin for the image processing. Thus, in the case of the film image having a narrow density range, the dynamic range in the image processing becomes very narrow, making it difficult to process the image with high accuracy. As a result, the quality of the reproduced image will be considerably reduced.

SUMMARY OF THE INVENTION

It is an object of the present invention to provide an apparatus for reproducing photographed images which has overcome the problems in the prior art.

It is another object of the present invention to provide an apparatus for reproducing photographed images which can not only detect an actual density of each film image to display clearer images but also display a multi-image and reproduce film images in a shorter time.

The present invention is directed to an apparatus for reproducing images recorded on successive frames of a film recorded with information, the apparatus comprising: a film feeder which feeds the film in a first direction and a second direction opposite to the first direction; an information reader which reads the recorded information; a density detector which detects a density of each image; and a controller which places into operation; the information reader when the film is fed in the first direction; and the density detector when the film is fed in the second direction.

The information may be provided for each frame. The information may be magnetically recorded on the film.

The density detector may be placed into operation after the information reader.

The first direction may be a direction of forwarding the film while the second direction is a direction of rewinding the film.

It may be appreciated that the density detector is constructed by an image pick-up device which picks up each image; and a calculator which calculates an image density from the picked up image.

The film feeder may be made to feed the film in the first direction at a first speed and in the second direction at a second speed different from the first speed. The first speed may be faster than the second speed.

It may be appreciated to further provide an image pick-up device which picks up each image; and a reproducer which reproduces the picked up image. The image pick-up device may be placed into operation when the film is fed in the first direction. The image density provided by the density detector may be taken into account when picking up the image. The image pick-up device may be placed into operation when the film is fed in the first direction.

Also, the present invention is directed to an apparatus for reproducing images recorded on successive frames of a film recorded with information, the apparatus comprising: an information reader which reads the recorded information; a first image picking up device which picks up each image to detect a density of the image; and a second image picking up device which picks up each image to reproduce the image.

Further, the apparatus may be provided with a film feeder which feeds the film. The information reader, the first image picking up device, and the second image picking up device may be placed into operation one after another in this order. The film feeder, which may be made to feed the film in a first direction and in a second direction opposite to the first direction, further comprises a controller which places into operation: the information reader when the film is fed in the first direction; the first image picking up device when the film is fed in the second direction; and the second image picking up device when the film is fed in the first direction again. The film feeder may be made to feed the film at different speeds when the information reader is placed into operation, when the first image picking up device is placed into operation, and when the second image picking up device is placed into operation, respectively. Also, the film feeder may be made to feed the film: at a first speed when the information reader is placed into operation; at a second speed when the first image picking up device is placed into operation, the second speed being slower than the first speed; and at a third speed when the second image picking up device is placed into operation, the third speed being slower than the second speed. The image density detected by the first image picking up device may be adapted for determining an exposure value at which the second image picking up device picks up the image. A plurality of images, picked up by the second image picking up device, can be reproduced in the form of a multi-image in which the plurality of images are arranged in a predetermined pattern in a single frame.

Further, the present invention is directed to an apparatus for reproducing images recorded on successive frames of a film recorded with information, the apparatus comprising: a film feeder which is operable to feed the film at at least two different speeds; an information reader which reads the recorded information; a density detector which detects a density of each image; a reproducer which picks up and reproduces an image; and a controller which places into operation: one of the information reader, the density detector, and the reproducer when the film is fed at one speed; and the others when the film is fed at the other speed.

The information reader and the reproducer may be placed into operation when the film is fed in a direction of forwarding the film, while the density detector is placed into operation when the film is fed in a direction of rewinding the film.

It may be appreciated that the density detector is constructed by an image pick-up device which picks up each image; and a calculator which calculates an image density from the picked up image, the image density being adapted for determining an exposure value at which the reproducer picks up each image.

The film feeder may be made to feed the film at three different speeds when the information reader is placed into operation, when the density detector is placed into operation, and when the reproducer is placed into operation, respectively.

The film feeder may be made to feed the film: at a first speed when the information reader is placed into operation; at a second speed when the density detector is placed into operation, the second speed being slower than the first speed; and at a third speed when the reproducer is placed into operation, the third speed being slower than the second speed.

The reproducer may be made to display a multi-image in which a plurality of picked up images are arranged in a predetermined pattern in a single frame.

These and other objects, features and advantages of the present invention will become more apparent upon a reading of the following detailed description and accompanying drawings.

BRIEF DESCRIPTION OF THE DRAWINGS

FIG. 13 is a chart summarily showing a first reading and reproducing manner of the reproducing apparatus, the manner being adapted for reading magnetic information and reproducing film images of a forwardly recorded film;

FIGS. 20A and 20B are diagrams showing examples of a multi-image to be sequentially displayed, FIG. 20A showing a composition of a multi-image stored in a first image memory, and FIG. 20B a composition of a multi-image stored in a second image memory;

DETAILED DESCRIPTION OF THE PREFERRED EMBODIMENTS OF THE INVENTION

Figure 2:
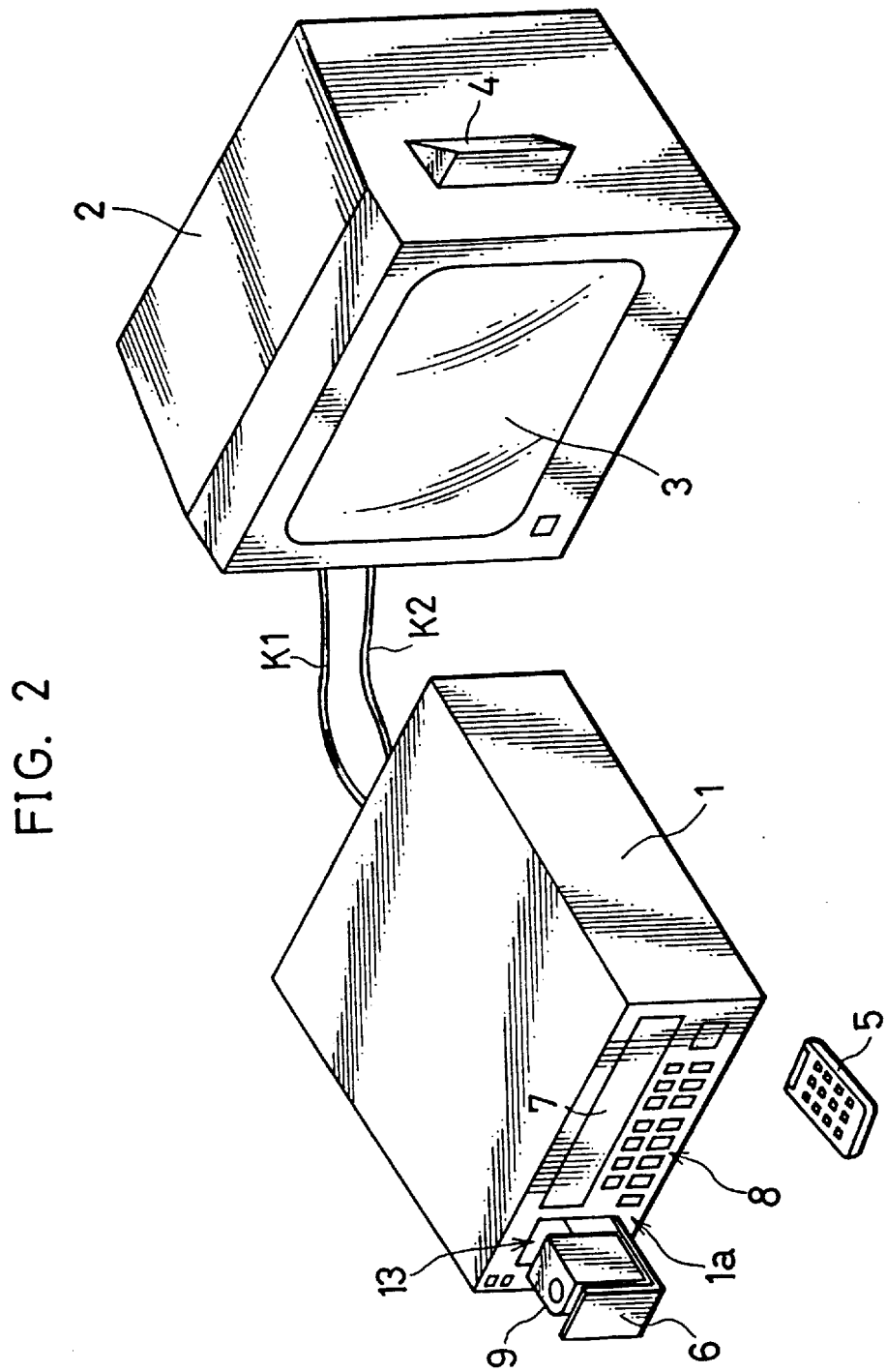
FIG. 2 is a perspective view showing an overall exterior of the film image reproducing apparatus.

FIG. 2 is a perspective view of one embodiment of a film image reproducing apparatus according to the invention.

A film image reproducing apparatus 1 picks up film images recorded in respective frames of a developed film 10 (see FIG. 5) contained in a film cartridge 9 by means of an image pick-up device, and reproduces the picked up images on a monitor TV 2 in accordance with a set presentation method. As shown in FIG. 2, the apparatus 1 is connected with the monitor TV 2 by way of a cable K1 for visual signals and a cable K2 for audio signals.

There are two kinds of presentation methods: one concerning reproduction of film images and the other concerning effect sounds such as BGM (background music). Both presentation methods are set by means of the film image reproducing apparatus 1. The film images are reproduced on a display screen 3 of the monitor TV 2 (display means), and the effects sounds are made audible by a pair of loudspeakers 4 disposed at the opposite side surfaces of the monitor TV 2.

The presentation method concerning the film image reproduction includes: reproduction with fade-in and fade-out, reproduction with panning (the film images are reproduced while being panned to the right from the left end or upwardly from the bottom end), reproduction with zooming, superimposition of character information, etc. In setting this presentation, there are set a variety of reproduction conditions including a reproduction method, designation of frames to be reproduced, order of frames to be reproduced, vertical inversion of the image, and 90 degree rotation of the image (posture conversion). The presentation method concerning the effect sounds includes insertion of BGM in conformity with the reproduction method of the respective film images. If necessary, narration can also be inserted.

Figure 5:
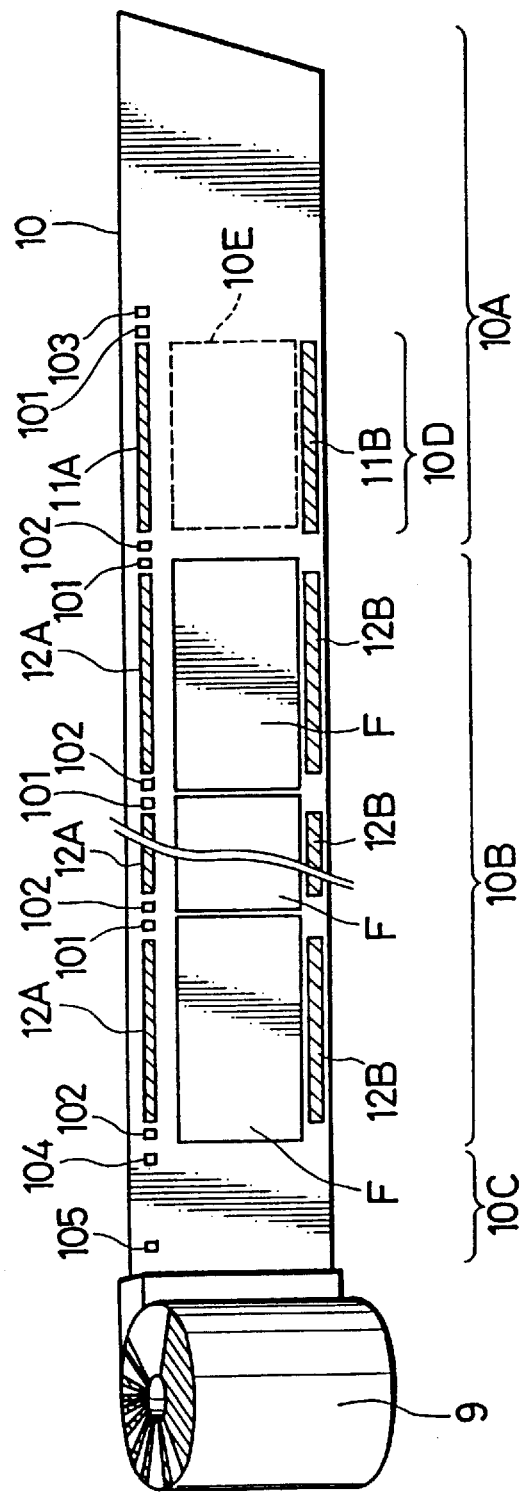
FIG. 5 is a perspective view showing a state where a film is withdrawn from the film cartridge.

The above presentation methods are set during the editing by means of the film image reproducing apparatus 1 and stored in magnetic recording portions 11A, 11B, 12A and 12B of the film 10 (see FIG. 5).

The film image reproducing apparatus 1 is provided at its front panel 1a with an eject table 6, a display 7, and an operation portion 8. A variety of operations including the reproduction of the film images and the setting of the presentation methods are performed by use of a variety of switches provided in the operation portion 8. The film image reproducing apparatus 1 is further provided with a remote controller 5. The above operations can also be performed by using the remote controller 5, instead of the operation portion 8. The eject table 6 is adapted to bring the film cartridge 9 inside the film image reproducing apparatus 1 and mount it in a film loader 13 (see FIG. 3) to be described later. The eject table 6 is slidably provided at the left side of the front panel 1a so that it can project forwardly from the front panel 1a. A rewind fork (not shown) projects upstanding from the bottom surface of the eject table 6. The film cartridge is mounted on the eject table 6 by fitting a drive hole 911 (see FIG. 4) of a spool 91 to the rewind fork.

Figure 4:
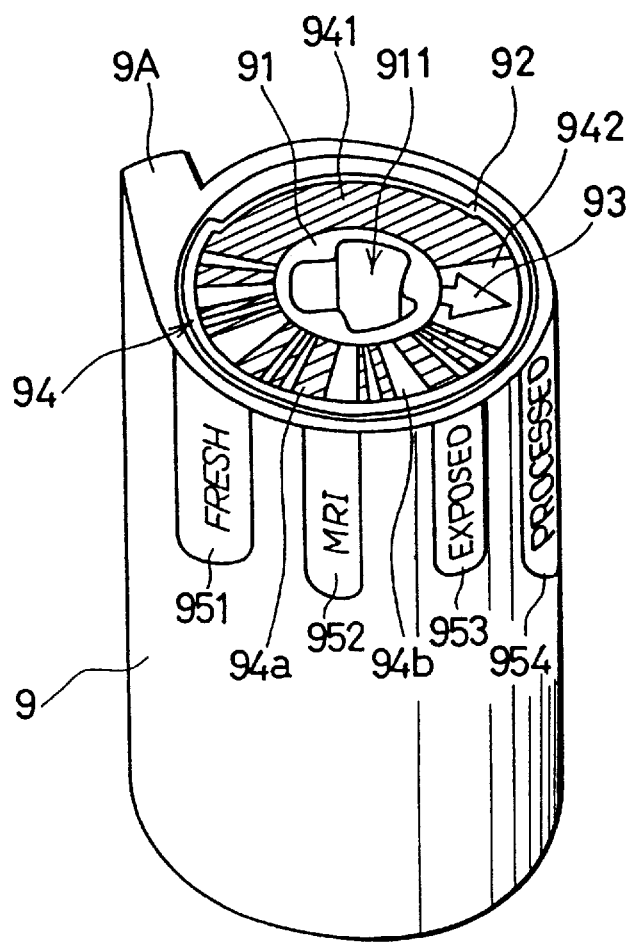
FIG. 4 is a perspective view of a film cartridge used in the film image reproducing apparatus.

FIG. 4 is a perspective view of the film cartridge 9 used in the film image reproducing apparatus, and FIG. 5 is a perspective view showing a state where a film is withdrawn from the film cartridge 9.

If the film cartridge 9 is not loaded in the film image reproducing apparatus 1, the film 10 is always contained in the cartridge up to a front end of a film leader 10A. The film image reproducing apparatus 1 is provided with an automatic loading mechanism for withdrawing the film 10 from the film cartridge 9 and automatically winding the film leader 10A about a take-up spool 163 (see FIG. 3) provided in the film loader 13 when the film cartridge 9 is mounted in the film loader 13.

The film cartridge 9 includes a data disk 92 at one end of the spool 91. The data disk 92 contains a bar code 94 representing information peculiar to the film such as film sensitivity and the number of frames (hereinafter referred to as film information). In this specification, dark portions 94a indicated by hatching, white portions 94b, a wide black zone 941, and a wide white zone 942 of the bar code 94 are referred to as bar, space, black zone, and quiet zone, respectively, for the sake of convenience.

The data disk 92 is so disposed as to be flush with an end face 9a of the cartridge 9 and rotatable together with the spool 91. The drive hole 911 fittable with the rewind fork mounted on the eject table 6 extends along the longitudinal axis of the spool 91.

In the data disk 92, there are 11 bars 94a and 11 spaces 94b, excluding the black zone 941 and the quiet zone 942. There are two kinds of bars 94a and spaces 94b depending upon the width thereof (bars and spaces having a larger width are referred to as wide bars and wide spaces, and bars and spaces having a smaller width are referred to as narrow bars and narrow spaces). The content of the film information is determined by the combination of these bars 94a and spaces 94b. The narrow space 94b and the narrow bar 94a are adjacent the black zone 941 and the quiet zone 942, respectively. In this embodiment, a ratio of the width of the wide bars and spaces to that of the narrow bars and spaces is set at 3:1.

On the surface of the data disk 92, there is written a pointer mark 93 in the form of an arrow for indicating the state of the film 10. Four kinds of display marks 951 to 954 are provided on the outer circumferential surface of the cartridge 9 to display a state of the film 10 contained in the cartridge 9.

The display marks 951 to 954 contain characters. The display mark 951, "FRESH", indicates that the film 10 is unexposed, the display mark 952, "MRI", indicates that the film 10 is partially exposed up to a certain frame, the display mark 953, "EXPOSED", indicates that the film 10 is completely exposed, and the display mark 954, "PROCESSED" indicated that the film 10 is developed. It should be noted that the display marks 951 to 954 may contain symbols and signs, instead of characters.

The state of the film 10 in the cartridge 9 can be seen from the display mark pointed by the pointer mark 93. For example, if the mark 93 points to the display mark 951, "FRESH", the film 10 is unexposed. If the mark 93 points to the display mark 952, "MRI", the film 10 is partially exposed up to a certain frame.

As shown in FIG. 5, the film 10 contained in the cartridge 9 has three areas: a film leader 10A, an image recording area 10B and a film end 10C, in this order from the leading end thereof.

The film leader 10A is used to withdraw the film 10 from the cartridge 9. An unexposed area 10D of size of substantially one frame is provided at a rear part of the film leader 10A. At the opposite vertical sides of the unexposed area 10D, there are provided strip-like magnetic recording portions 11A and 11B on which index information concerning the film 10 (e.g., the number of frames and titles of photographed contents) is magnetically recorded. An area between the magnetic recording portions 11A and 11B is an orange base area 10E which is used to read density information of the unexposed area 10D of the film 10.

The color film assumes orange of a specified density even when it is not yet exposed. The film image in each frame F has a density which is a sum of a density of orange (hereafter referred to as an orange base density) and a density of the photographed image. In order to process the image signal obtained by picking up the film image with high accuracy, the orange base density needs to be subtracted from the density of the picked up image. Accordingly, in this embodiment, information concerning the orange base density (hereinafter referred to as an orange base data) is read by sensing the orange base area 10E in order to read the orange base data before the film images in the respective frames F are read.

It is sufficient to read the orange base data before the signal representing the picked up image is processed during reproduction of the film image. Therefore, this data may be read by sensing the film end 10C or any unexposed portion of the film 10 such as spaces between the adjacent magnetic recording portions or between the adjacent frames.

The image recording area 10B is an area including the film images in the respective frames F to be picked up. A specified number of images are recorded at a specified pitch. The film end 10C is an unexposed area provided at the rear end of the film 10. The film end 10C has a selected size so that the last frame F can be withdrawn from the cartridge 9 by a specified distance.

Rectangular perforations 101 to 104 are formed at the upper edge of the film 10. The perforations 101 and 102 indicate the unexposed area 10D and the respective frames F. Specifically, the perforations 101 are formed at the front end of the unexposed area 10D and the respective frames F. The perforations 102 are formed at the rear end of the unexposed area 10D and the respective frames F. The perforation 103 indicates the front end of the rear end portion of the film leader 10A, and is formed before the perforation 101 indicative of the front end of the unexposed area 10D by a specified distance.

The perforation 104 indicates the leading end of the film end 10C, and is formed after the perforation 102 indicative of the rear end of the last frame F by a specified distance. The perforation 105 indicates the rear end of the film end 10C, and is formed after the perforation 104 by a specified distance.

The strip-like magnetic recording portions 11A, 11B and 12A, 12B are provided at opposite sides of the unexposed area 10D and the respective frames F along the upper and lower edges of the film 10. The magnetic recording portion 11A at the upper edge of the film 10 is provided between the perforation 101 indicative of the position of the unexposed area 10D and the perforation 102, and the magnetic recording portions 12A at the upper edge of the film 10 is provided between the perforations 101 indicative of the positions of the respective frames F and the corresponding perforations 102.

The magnetic recording portions 11A and 11D are adapted to record all information concerning the film 10 such as the set presentation conditions in addition to the index information. The magnetic recording portions 12A are adapted to record photographing information including photographing information for the respective frames F such as dates of the photographing, information as to whether the picture is vertically or horizontally framed, print information as to whether a final picture will be of panorama format (P), high vision format (H), or L-print format (hereinafter, referred to as PHL information), exposure control values and magnification. The magnetic recording portions 12B are adapted to record exposure conditions, the number of prints to be made, and other information concerning the respective frame F which are necessary during development.

Figure 3:
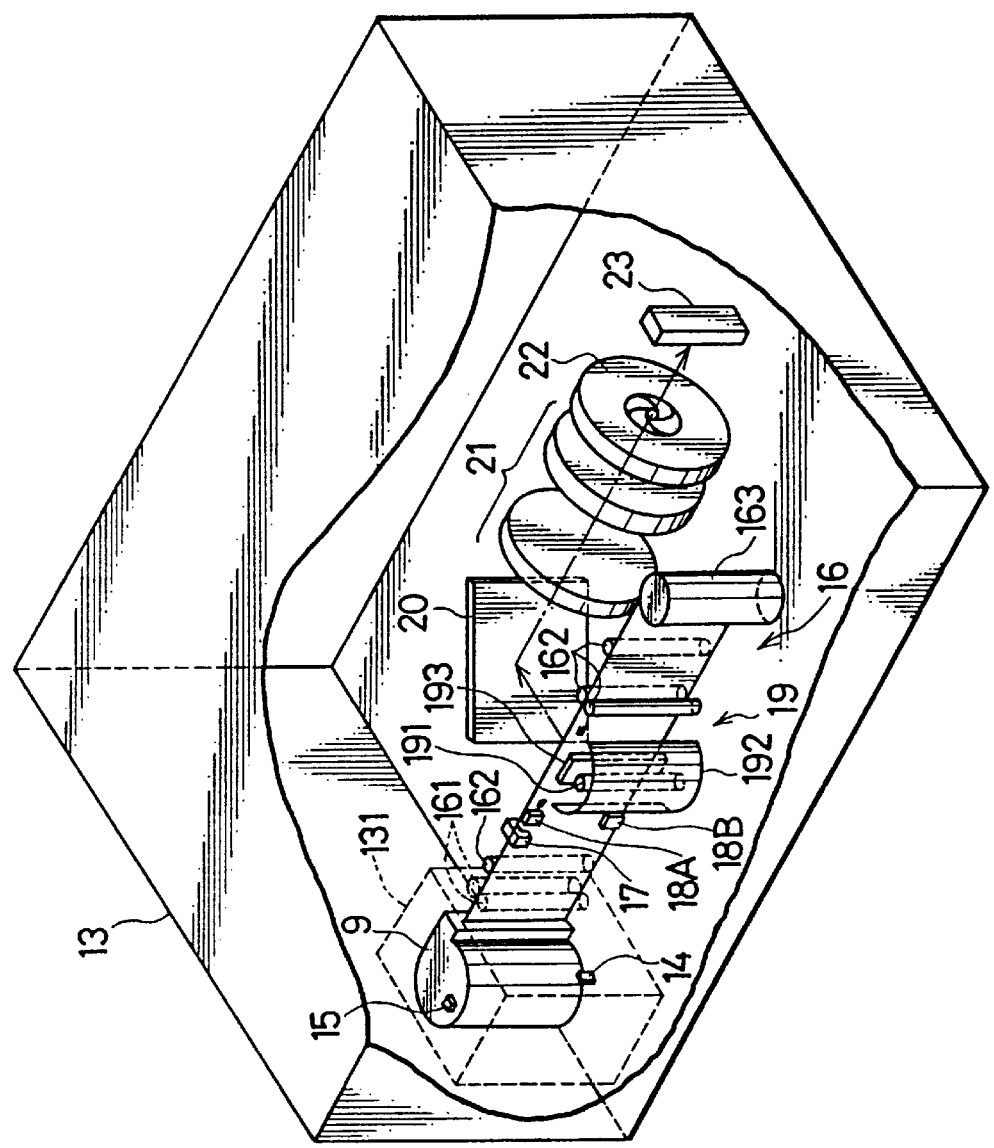
FIG. 3 is a perspective view, partially broken, showing a construction of a film loader of the film image reproducing apparatus.

FIG. 3 is a perspective view showing the construction of the film loader 13.

The film loader 13 is provided in an accommodated position of the eject table 6 in the film image reproducing apparatus 1.

A table container 131 of the eject table 6 is provided in its specified lower position with a cartridge sensor 14 for detecting the presence of the film cartridge 9 in the eject table 6, and in its specified upper position with a photoreflector 15 for reading the bar code 94 provided on the upper end face of the film cartridge 9. A sensor signal of the cartridge sensor 14 is inputted to a system controller 44 which acts as a controller for the system to be described later. The film information represented by the bar code 94 is read by the photoreflector 15 during the automatic loading of the film 10 and inputted to the system controller 44.

Behind the table container 131, there is provided a loading mechanism 16 including a pair of feed rollers 161, a guide roller 162 and a take-up spool 163 for taking up the film 10. A photoreflector 17 for detecting the perforations 101 to 105 of the film 10 is disposed in a specified position along a feeding path of the film 10 in the loading mechanism 16 and adjacent the table container 131.

A magnetic head 18A (magnetic information reading/writing means) for reading and writing information from and in the magnetic recording portions 11A and 12A is provided adjacent the photoreflector 17. Further, a magnetic head 18B (magnetic information reading/writing means) for reading and writing information from and in the magnetic recording portions 11B and 12B is provided below the magnetic head 18A.

The film 10 is fed (taken up and rewound) by drivingly rotating the feed rollers 161. While the film 10 is being fed, the perforations 101 to 105 formed in the film 10 are detected by the photoreflector 17 and the sensor signals are inputted to the system controller 44. A distance and a position to which the film 10 is fed are controlled by the system controller in accordance with the sensor signals corresponding to the perforations 101 to 105.

An illuminating unit 19 for illuminating the film images in the respective frames F is provided between the magnetic heads 18A, 18B and the guide roller 162. The illuminating unit 19 includes a light source 191 such as a halogen lamp, fluorescent lamp, or xenon lamp, a reflector 192 for projecting light from the light source 191 toward the film 10 and a diffuser 193 for projecting the light from the light source uniformly at the film image G.

The illuminating unit 19 is provided at the right side of the feeding path with respect to the take-up direction of the film 10. A mirror 20 for introducing a light image of the film image to an image pick-up device 23 (image pick-up means) is provided in a position opposed to the illuminating unit 19 on the left side of the feeding path. Further, a lens system 21 for focusing the light image of the film image on the image pick-up device 23 and an iris 22 (exposure control means) for adjusting the amount of light incident upon the image pick-up device 23 are provided in this order on a path of light reflected by the mirror 20 and between the mirror 20 and the image pick-up device 23.

The image pick-up device 23 includes a color image sensor in which, for example, three CCDs (charge coupled devices) provided with color filters of red (R), green (G) and blue (B) are disposed side by side in a direction normal to a sensor axis. The image pick-up device 23 (hereinafter referred to as a CCD line sensor 23) is so disposed that its sensor axis corresponds with the lateral direction of the projected film image (direction normal to the feeding direction of the film 10), and relatively scans the film 10 being fed to pick up the respective film images.

The CCD line sensor 23 is provided with a sensing section, a transfer section and a discharge section. The sensing section converts a light image into an electrical signal representing an image (photoelectric conversion) by storing electric charges in proportion to an amount of incident light. The transfer section is adapted to store the electric charges retracted from the sensing section. The discharge section discharges unnecessary electric charges stored in the sensing section.

Figure 1:
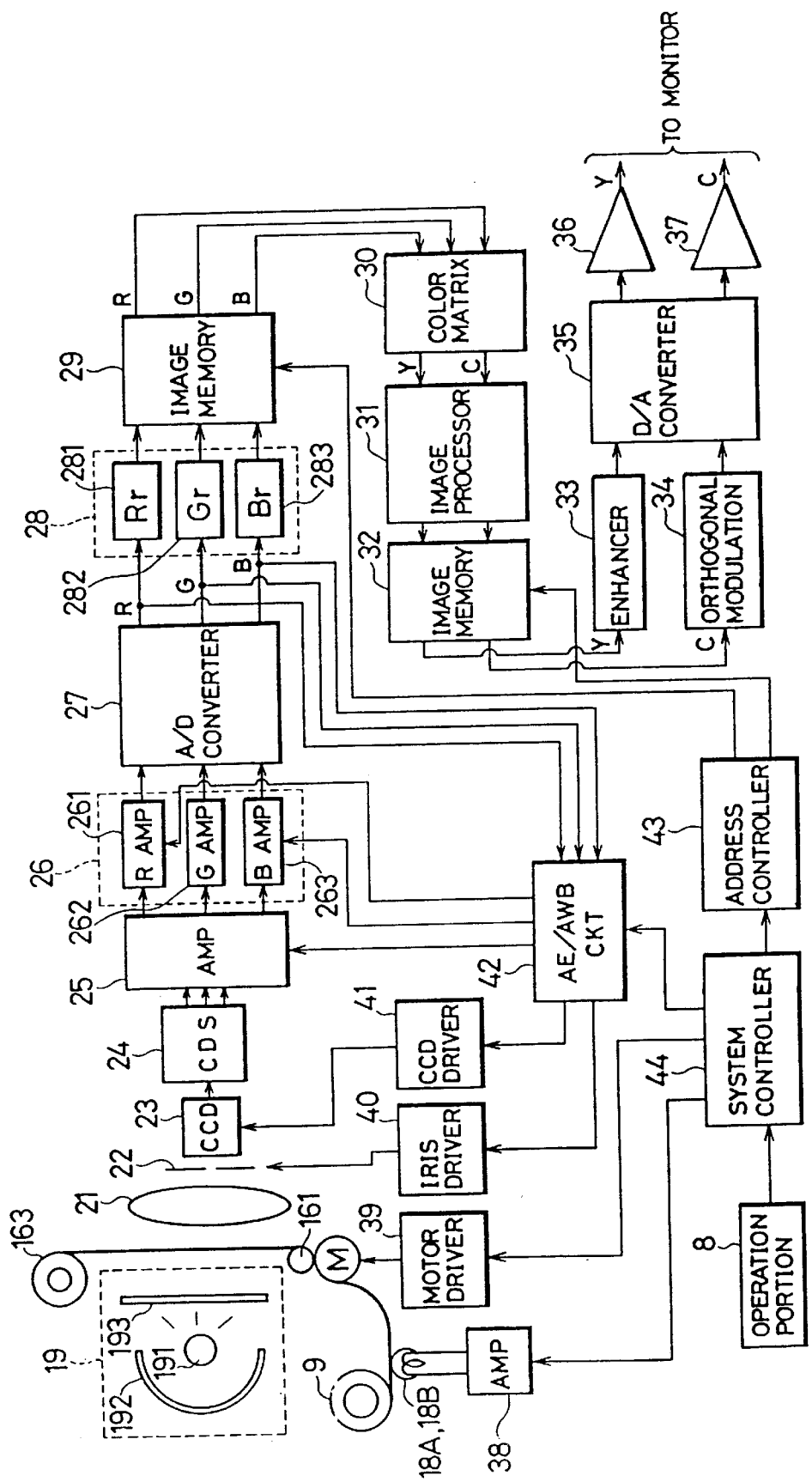
FIG. 1 is a block diagram showing a construction of an image picking up/reproducing unit of a film image reproducing apparatus according to the invention.

The CCD line sensor 23 stores electric charges according to the amount of incident light in the sensing section (image pick-up), transfers the stored electric charges to the transfer section in a specified cycle, and outputs a picked up image to an image processor 31 (see FIG. 1). The sensor 23 alternately repeats the storing and transfer of electric charges a plurality of times while the film image is scanned, picking up the film images by the line.

Figure 6:
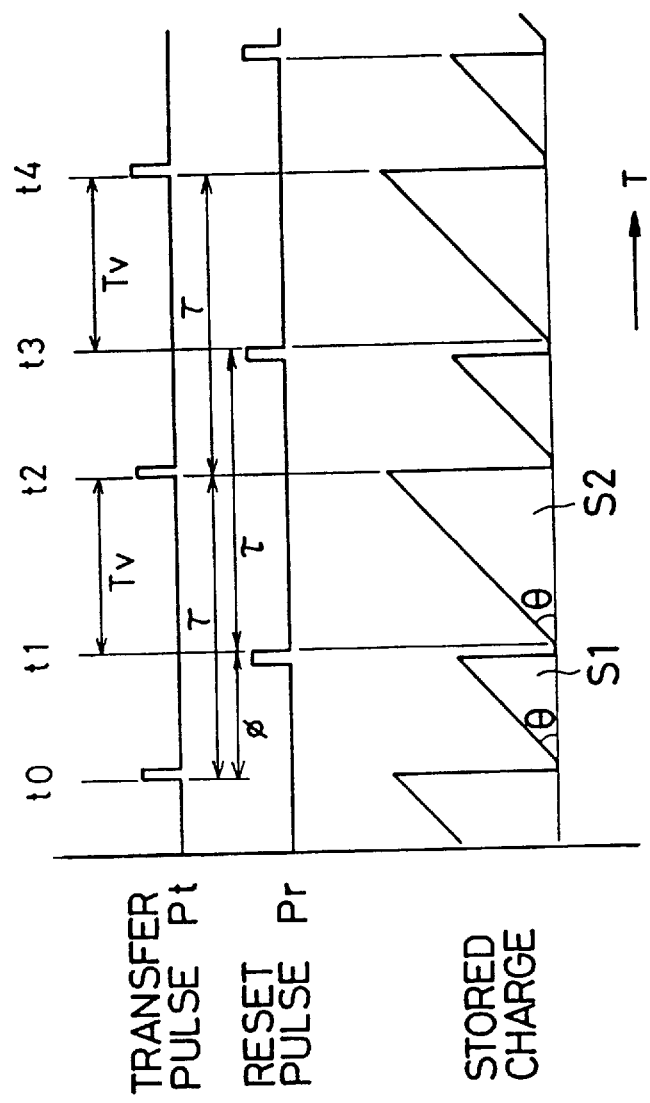
FIG. 6 is a diagram showing a relationship between a waveform of a transfer pulse, a waveform of a reset pulse, and a waveform of a level of electric charges stored in a sensing section of the CCD line sensor.

FIG. 6 is a diagram showing a relationship between a waveform of a transfer pulse used to control transfer of electric charges stored in the sensing section to the transfer section, a waveform of a reset pulse used to control discharge of unnecessary electric charges stored in the sensing section, and a waveform of a level of electric charges stored in the sensing section.

The CCD line sensor 23 starts the image pick-up operation upon receipt of an image pick-up start signal from a CCD driver 41 (see FIG. 1) to be described later and stops this operation upon receipt of an image pick-up stop signal. Upon start of the image pick-up operation, electric charges corresponding to the amount of incident light are stored in the sensing section. The stored electric charges are transferred to the transfer section in accordance with a transfer pulse Pt sent in a specified cycle $\tau$ from the CCD driver 41, outputted as an image signal to the image processor 31, and discharged in accordance with a reset pulse Pr.

The reset pulse Pr is sent at a timing delayed from the transfer pulse Pt by phase $\phi$. The unnecessary electric charges stored in the sensing section are discharged until the reset pulse Pr is inputted after the outputting of the electric charges as an image signal in accordance with the transfer pulse Pt. An exposure period of the CCD line sensor 23 (corresponding to a shutter speed Tv) is controlled by controlling an output timing of the reset pulse Pr relative to that of the transfer pulse Pt (phase $\phi$).

A period between time t0 and time t2 during which the transfer pulse Pr is inputted is described as an example. When the stored electric charges are taken out as an image signal at time t0, electric charges according to an amount of light newly incident upon the sensing section are stored. The level of electric charges stored in the sensing section increases in proportion to an amount of stored electric charges. An upward inclination $\theta$ of the level of the stored electric charges is in proportion to the intensity of the incident light. The higher the intensity, the larger the upward inclination $\theta$.

When the reset pulse Pr is inputted at time t1 delayed by phase $\phi$ from time t0, electric charges stored in the sensing section during the period between t0 and t1 (corresponding to an area S1 enclosed by a small triangle) are discharged as unnecessary electric charges. Electric charges are newly stored in the sensing section from time t1. When the next transfer pulse Pt is input at time t2 after lapse of one cycle $\tau$ from time t0, electric charges stored during a period between time t1 and t2 (corresponding to an area S2 enclosed by a large triangle) are transferred to the transfer section and taken as an image signal.

Out of the light receiving period $\tau$ between time t0 and time t2 in the sensing section, a period Tv ($=\tau-\phi$) between time t1 and time t2 serves substantially as an exposure period of the CCD line sensor 23, namely an image pick-up period. The exposure period Tv corresponds to a shutter speed of normal cameras. As is clear from FIG. 6, the exposure period Tv of the respective film images can be controlled by controlling the phase $\phi$. In other words, as the phase $\phi$ is made larger, the exposure period Tv becomes shorter and the shutter speed becomes greater.

When picking up the film image, a specified exposure amount is controlled by adjusting an aperture value Av of the iris 22 and the exposure period Tv of the CCD line sensor 23 (hereinafter referred to as an electronic shutter speed Tv). The iris 22 and the CCD line sensor 23 constitute exposure control means. However, the film 10 is scanned at a higher speed when the film images are picked up for a multi-image than when the film images are picked up to be reproduced. In such a case, in view of difficulty to set the aperture value Av of the iris 22 for each film image, the exposure amount for each film image is controlled by keeping the aperture value Av of the iris 22 constant and adjusting only the electronic shutter speed Tv.

In other words, when the film images are picked up continuously at a high speed, the exposure control means is comprised of only the CCD line sensor 23.

Referring back to FIG. 2, when the film cartridge 9 is mounted in the film loader 13, the film image reproducing apparatus 1 reads the orange base data, the information recorded in the magnetic recording portions 11A, 11B, 12A and 12B (hereinafter referred to as magnetic information) and the density information of the film images in the respective frames F before the film images in the respective frames F are reproduced. The film image reproducing apparatus 1 also picks up the film image in all frames F, combines the picked up images into an image (hereinafter, referred to as a multi-image) in which the picked up images are arranged in a specified two-dimensional pattern, and displays the multi-image on the display screen 3 of the monitor TV 2.

More specifically, immediately after the loading of the film cartridge 9, there are read the orange base data necessary to display the multi-image, pick up the film images in the respective frames F to reproduce them, and process the picked up images, the magnetic information and data necessary for the exposure and color correction. The multi-image is displayed as an index information of the film 10 and as a processing screen for setting reproduction conditions after the film images to be combined into the multi-image are picked up.

Figure 7:
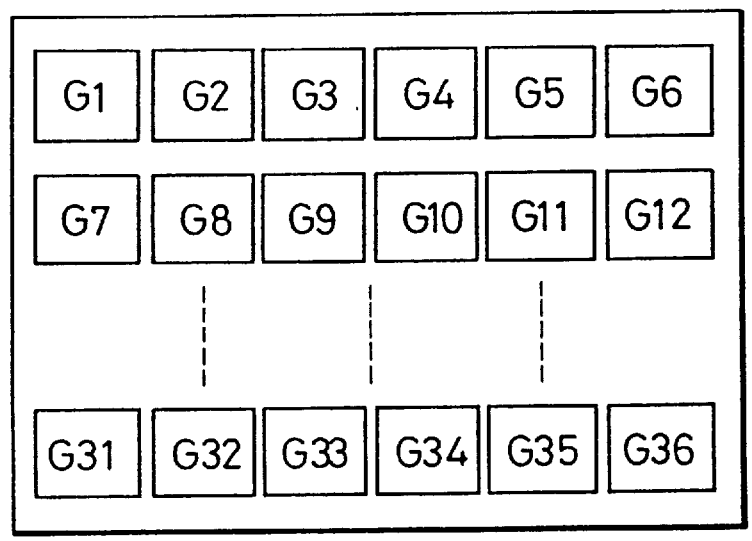
FIG. 7 is a diagram showing an example of display of a multi-image in which thirty six frames of film images are collectively displayed.
Figure 8:
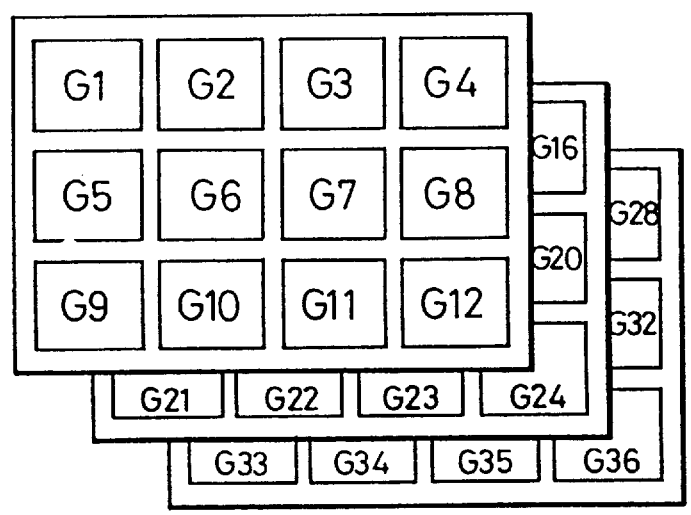
FIG. 8 is a diagram showing an example of display of multi-images in which thirty six frames of film images are divided into three groups.

FIGS. 7 and 8 show examples of display of a multi-image, respectively. Specifically, FIG. 7 shows an example where all thirty six frames of film images are collectively displayed on the screen at the same time, and FIG. 8 shows an example where thirty six frames of film images are divided into three groups of 12 frames and each group is displayed on the screen during a respective time.

The multi-image shown in FIG. 7 is such that thirty six frames of film images are combined and arranged in a (6, 6) matrix format. The film images G1 to G36 in the frames F are chronologically arranged, i.e., they are arranged in positions (1, 1), (1, 2), ..., (2, 1), (2, 2), ..., (6, 5), (6, 6) from the oldest film image to the newest one.

In FIG. 8, there are shown three multi-images. each containing 12 film images. In each multi-image, 12 film images are combined in a (3, 4) matrix format. In this display example, the film images of all frames F are displayed by switchingly displaying the three multi-images.

The suitable arrangement pattern of the multi-image is determined in consideration of the total number of frames and display size of the respective frames. In displaying a plurality of multi-images, the multi-images may be displayed while being vertically scrolled line after line.

Although this embodiment is described with respect to the film containing thirty six frames, a film containing an arbitrary number of frames can be scanned to generate a multi-image in a pattern suited to the number of the frames in the same manner and the generated multi-image can be displayed on the display screen 3 of the monitor TV 2.

The density information of the film images of the respective frames F are read to calculate suitable exposure control values (aperture value Av, electronic shutter speed Tv) and a white balance correction value (hereinafter referred to as a WB correction value) which are necessary to pick up the film images to reproduce them. The density information of the film images of the respective frames F (hereinafter referred to as an exposure/color correction calculation data) is obtained by measuring the density of the film image in a plurality of discrete positions. In this embodiment, this data is obtained from the images picked up to generate the multi-image. Accordingly, in this embodiment, the exposure/color correction calculation data is read at the same time as the film images are picked up to generate the multi-image.

When the eject table 6 carrying the film cartridge 9 is contained in the table container 131, the presence of the film cartridge 9 is detected by the cartridge sensor 14 and the film information represented by the bar code 94 is read by the photoreflector 15. Subsequently, the film leader 10A of the film 10 is withdrawn by the feed rollers 161 and the leading end thereof is wound around the take-up roller 163, thereby performing the automatic loading.

Thereafter, the film 10 is reciprocally moved to read the orange base data, the magnetic information and the exposure/color correction calculation data and to pick up the film images to generate the multi-image.

In this embodiment, after the loading of the film 10, the film 10 is forwarded at a high speed to the last frame F (first scanning) to read the orange base data and the magnetic information. Then, the film 10 is rewound at a middle speed to the first frame F (second scanning) to read the exposure/color correction calculation data and pick up the film images to generate the multi-image.

The reading of the magnetic information, and the reading of the exposure/color correction calculation data and the picking up of the film images for the multi-image are separately performed because a suitable scanning speed of the film 10 varies depending upon the operation. It should be noted that "high speed" and "middle speed" are defined on the basis of the feeding speed of the film 10 when the film images of the respective frames F are picked up during the reproduction.

The scanning speed at which the film images are picked up to generate the multi-image is higher than the scanning speed at which the film images are picked up to be reproduced, in order to display the multi-image as fast as possible. The film images in the multi-image are smaller than the normal reproduced images, and are therefore not required to have high image quality. Accordingly, all pixel data constituting the film image (data obtained by the respective pixels constituting the CCD line sensor 23) may not be necessary. Thus, in this embodiment, the film images are scanned in a discrete manner (discrete scanning) to read the pixel data while compressing them in the scanning direction, thereby increasing the scanning speed when the film images for the multi-image are picked up.

The discrete scanning is such that the images are scanned at a normal scanning speed (a scanning speed used for the normal image pick-up operation) only in line positions where the images are to be read, and they are scanned at a high speed in other line positions. For example, if the lines are the 1st line, 2nd line, 3rd line, ... from the leading line, the film image is picked up while scanning the image at the normal scanning speed only in the positions of lines which are a multiple of 6, namely the 6th line, 12th line, . . . , 6k-th line (k=1, 2, . . . ). The film image is scanned at a high speed in other line positions without being picked up. In this way, the scanning speed can be about six times as fast as the scanning speed during the reproduction. In this case, the size of the picked up image is reduced to ⅙ of the original image size.

A suitable scanning speed for the magnetic information is higher than the scanning speed used when the film images are picked up, and can be several times as fast as the scanning speed used when the film images are picked up to generate the multi-image. The reading of the magnetic information and the exposure/color correction calculation data and the picking up of the film images to generate the multi-image are described later.

When the film images are picked up, the light source 191 of the illuminating unit 19 is caused to emit light at a specified illuminance and a specified amount of light representing several lines of the film image is projected onto the CCD line sensor 23 by way of the reflector 20, the lens system 21 and the iris 22. The CCD line sensor 23 is allowed to relatively scan the film image by controlling the image pick-up operation of the CCD line sensor 23 in synchronism with the feeding timing of the film image, thereby picking up one frame of film image.

FIG. 1 is a block diagram of an image picking up/reproducing unit of the film image reproducing apparatus according to the invention.

In FIG. 1, like reference numerals denote like elements shown in FIG. 3. A correlative double sampling (CDS) circuit 24, an amplifier 25, a white balance (WB) circuit 26, an analog-to-digital (A/D) converter unit 27 and a γ correction circuit unit 28 constitute an image signal processing circuit for applying specified signal processing to the respective color image signals of R, G, B outputted from the CCD line sensor 23.

The CDS circuit 24 attenuates noises included in the image signals such as reset noises and sampling noises produced in the CCD line sensor 23. The amplifier 25 corrects levels of the respective color image signals of R, G, B.

The WB circuit 26 is provided with three amplifiers 261, 262 and 263 corresponding to the respective color image signals of R, G, B, and automatically corrects the white balance of the picked up image by correcting the levels of the image signals of R and B based on the level of the image signal of G. WB correction values (gains AGr, AGb of the amplifiers 261, 263 for the image signals of R, B) are calculated by an automatic exposure/white balance (AE/AWB) arithmetic circuit 42 to be described later, and input to the WB circuit 26 in synchronism with input of the image signals to the WB circuit 26.

The A/D converter unit 27 converts the analog image signals into digital image signals (hereinafter referred to as image data). The A/D converter unit 27 also includes three A/D converters corresponding to the image signals of R, G, B.

The dynamic ranges of the respective A/D converters of the unit 27 are set according to the density characteristic of the loaded film 10 by the AE/AWB arithmetic circuit 42. More specifically, the AE/AWB arithmetic circuit 42 calculates the dynamic ranges of the A/D converters corresponding to the respective colors based on the orange base data obtained by sensing the orange base area 10E of the loaded film 10 and sets the dynamic ranges based on the calculation results.

Transmittance characteristics of the respective colors of R, G, B of the film vary within a specified range depending upon the kind of the film and the development conditions. In fixedly setting a range of the signal level processable by the A/D converter unit 27 (density range), if a variation in the transmittance characteristic of the film is considered, this range needs to be set considerably broader than the density range of the actual film images so that the image signals obtained by picking up film images recorded in an arbitrary film can be processed without saturating their signal level.

However, if the density range processable by the A/D converter unit 27 is fixedly set, the density range of the image signals obtained by picking up the film images is excessively narrow compared to the density range processable by the A/D converter unit 27 when the density range of the actually loaded film is narrow. Thus, the resolution of the image signals becomes relatively poor, making it difficult to process the image signals with high accuracy.

Figure 9:
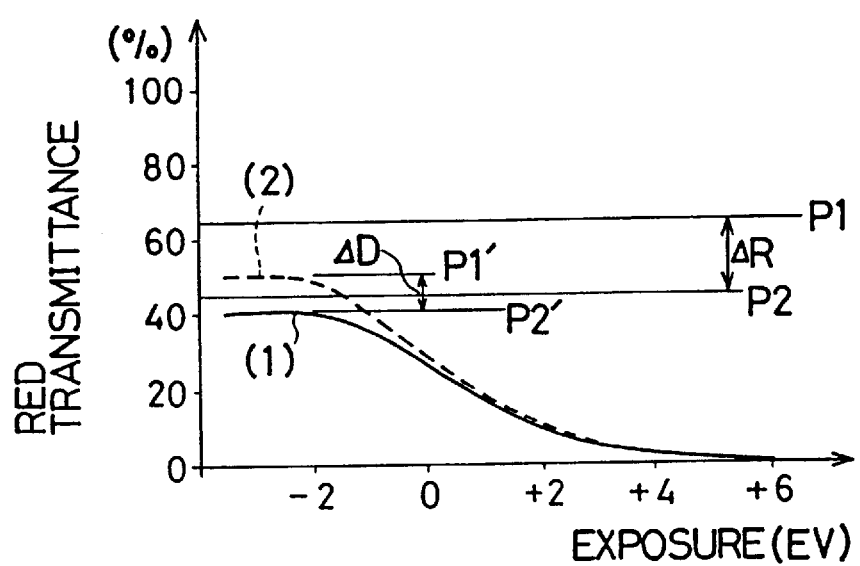
FIG. 9 is a graph showing a red transmittance (density) characteristic of a film in relation to an exposure control value.

FIG. 9 is a graph showing a transmittance (density) characteristic of red color of the color film in relation to an exposure control value.

In FIG. 9, a transmittance characteristic (1) indicated by solid line represents a case of the narrowest density range, and a transmittance characteristic (2) represents a case of the broadest density range. A difference ΔD between the density ranges of the transmittance characteristics (1) and (2) is a variation of the density range.

When the dynamic ranges of the A/D converter unit 27 are fixedly set, in consideration of a variation in the density range of the film, an upper limit of the density range processable by the A/D converter for the image signal of R needs to be set at transmittance P1 (>P1' (%)) which is a sum of an upper limit (P1' (%)) of the transmittance characteristic (2), namely the broadest density range, and a certain margin.

In this case, if the loaded film 10 has, for example, a transmittance characteristic (1), the density range processable by this A/D converter becomes too broad compared with the actual density range (0 to P2' (%)) of the image signals. This results in reduced accuracy to actually process the image signals.

More specifically, despite the fact that the upper limit of the density range processable by the A/D converter for the image signal of R is sufficient to be set at transmittance P2 slightly higher than P2', there exists a range ΔR (P1–P2) which is actually unnecessary. Thus, the actual signal processable range becomes narrower in relation to the entire range. In this graph, the range is reduced to about 80% (P2/P1). As a result, the resolution of the image signal level of R becomes relatively poor.

In this embodiment, the orange base data of the film 10 (data concerning the maximum transmittance of the film 10) is read before the film images are picked up, and the density ranges processable by the A/D converter unit 27 are set based on the read orange base data.

Accordingly, the density range processable by the A/D converter for the image signal of R is set as follows. If the loaded film 10 has, for example, a transmittance characteristic (1), this density range is set at 0 to P2 (%) which is necessary to process the image signals obtained by picking up the film images of the film 10 based on the orange base data P2' (%). If the loaded film 10 has, for example, a transmittance characteristic (2), this density range is set at 0 to P1 (%) which is necessary to process the image signals obtained by picking up the film images of the film 10 based on the orange base data P1' (%).

The above is the same as the other color components of the film: G and B. The density ranges processable by the A/D converters for the image signals of G and B are suitably set based on the orange base data. The picked up image can be suitably processed within a proper density range according to the density range of the film images regardless of variation in the density ranges of the respective colors of R, G, B among films and variation in balance of color components of R, G, B among films.

The density information of an unexposed area at the leading end of the developed film, and exposure control values and image processing conditions used in picking up film images of the respective frames are set based on the density information, so that a density range of the unexposed area is subtracted from a density range of the respective film images. Accordingly, the film images of the respective frames can be read and processed with high accuracy and the reproduced images are given a higher quality.

Referring back to FIG. 1, the image data of R, G, B outputted from the A/D converter unit 27 are inputted to the γ correction circuit unit 28 and the AE/AWB arithmetic circuit 42.

The γ correction circuit unit 28 corrects density gradation (γ) of the image data into a specified nonlinear density gradation (γ). The circuit unit 28 includes three γ correction circuits 281, 282, 283 corresponding to the image data of the respective colors of R, G, B. γ correction is applied to these image data of the respective colors of R, G, B. The γ correction circuits 281, 282 and 283 are each provided with a random access memory (RAM) for storing a conversion table used to convert the γ-characteristic, and process the image data using this conversion table so that the image data has a nonlinear density gradation.

A first image memory 29 stores the picked up images represented by image data of R, G, B to which specified processing is applied by the CDS circuit 24, the amplifier 25, the WB circuit 26, the A/D converter unit 27 and the γ correction circuit unit 28. The first image memory 29 has at least a capacity for storing one frame of picked up image. When the film images of the respective frames F are reproduced, the film images picked up by the CCD line sensor 23 are renewably stored in the first image memory one after another.

When the multi-image is displayed, the respective film images picked up by the CCD line sensor 23 are renewably stored in the first image memory 29 after being reduced in size to those suitable to generate a multi-image by means of image data compression.

Figure 10A:
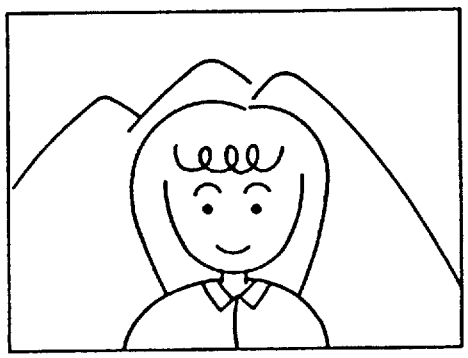
FIGS. 10A to 10C are diagrams showing how to generate a multi-image, FIG. 10A showing a film image, FIG. 10B an image picked up to generate a multi-image, and FIG. 10C an image reduced in size for the multi-image.
Figure 10B:
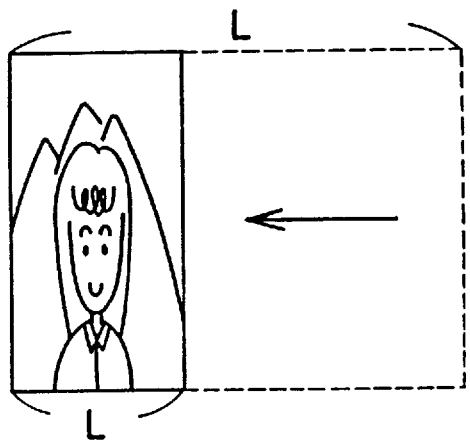
Figure 10C:
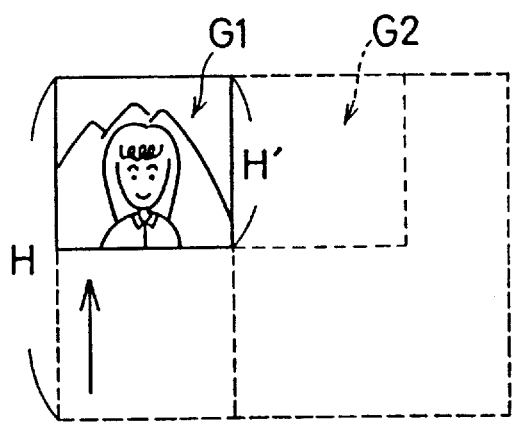

FIGS. 10A to 10C are diagrams showing how to generate a multi-image, FIG. 10A showing a film image, FIG. 10B an image picked up to generate a multi-image, and FIG. 10C an image reduced in size for the multi-image.

As described above, when the film images are picked up to generate a multi-image, the film 10 is fed at a higher speed than when the film images are picked up to be reproduced, i.e., discontinuous scanning is performed. Accordingly, the size of the picked up images are reduced in the feeding direction of the film 10 (a lateral direction of a horizontally frame image) as shown in FIG. 10B. A reduction ratio (L'/L) is substantially in proportion to the feeding speed of the film 10. A lateral dimension L' of the picked up image is set at a lateral dimension of the display size of the multi-image by controlling the feeding speed of the film 10 based on a ratio of the lateral dimension of the reproduced image to that of the film images in the multi-image.

The reduced picked up images are stored in the first image memory 29 while the image data are compressed in the longitudinal direction (widthwise direction) after specified signal processing is applied thereto by the CDS circuit 24 through the γ correction circuit unit 28. By this image compression, the picked up images whose size is reduced in the lateral direction as well as in the longitudinal direction as shown in FIG. 10C are stored in the first image memory 29.

A reduction ratio in the longitudinal direction is set at a ratio (H'/H) of longitudinal dimension H' of the respective images in the multi-image to that of the reproduced image. The image data representing the picked up image is compressed at a specified pitch in the longitudinal direction based on this reduction ratio before being stored in the first image memory 29.

The image data compression is controlled by an address controller 43, which also controls addresses of the image data in the first image memory 29, so that the picked up film images are stored in correspondence with the array thereof in the multi-image.

For example, the film images are stored so that a film image G1 is located in position (1, 1) of the array of the multi-image and a film image G2 is located in position (1, 2) thereof in FIG. 10C. Thereafter, each picked up image is stored in the first image memory 29 so that it is located in specified position (i, j) of the array of the multi-image.

A color difference matrix circuit 30 converts the picked up image represented by the image data of R, G, B and stored in the first image memory 29 into a picked up image consisting of a luminance signal Y and a chromatic signal C. Specifically, the circuit 30 generates the luminance signal Y by combining the respective image data of R, G, B at a predetermined ratio (=0.3R+0.59G+0.11B) and the chromatic signal C consisting of color difference signals (R−Y) and (B−Y) by subtracting the luminance signal Y from the respective image data of R and B.

The image processor 31 applies, if necessary, specified image processing to the picked up image consisting of the luminance signal Y and the chromatic signal C. The image processor 31 is provided with a function of enlarging, reducing and rotating the image, and enlarges, reduces or rotates the image in accordance with a control signal from the system controller 44.

The image is enlarged or reduced, for example, when the display size of the reproduced image is changed in accordance with the PHL information or the film images are clipped. The image is rotated, for example, when a horizontally framed image is converted into a vertically framed image or an image is vertically reversed.

A second image memory 32 stores the picked up image output from the image processor 31 and acts as a buffer memory for the monitor TV 2. The second image memory 32 reads the image data representing the stored picked up image in accordance with a scanning rate of television.

The address controller 43 controls the addresses of the first and second image memories 29 and 32 and a timing at which the image data are read from the first image memory 29 to be stored in the second image memory 32. The first and second image memories 29 and 32 store the image data representing the picked up images in accordance with addresses input from the address controller 43. The image data stored in the first image memory 29 are read in accordance with a reading timing input from the address controller 43.

The display timing of the multi-images in the sequential multi-image display can be controlled by controlling the reading timing of the image data from the first image memory 29 to the second image memory 32.

The sequential multi-image display is such that, each time one film image is picked up, the multi-image generated is from the already picked up images and sequentially displayed on the display screen 3 of the monitor TV 2. This will be described in detail later.

An enhancer 33 applies an outline correction to the luminance signal Y. An orthogonal modulation circuit 34 is internally provided with a circuit for generating a carrier and modulates the chromatic signal C consisting of the color difference signals (R–Y) and (B–Y) with the generated carrier so that the output contains the two sidebands without the carrier. A digital-to-analog (D/A) converter 35 converts the digital luminance signal Y and the modulated chromatic signal C into analog signals. Buffers 36 and 37 are adapted to output the luminance signal Y and the modulated chromatic signal C to the monitor TV 2.

An amplifier 38 amplifies and shapes the waveform of the data (digital signals) representing the magnetic information read by the magnetic heads 18A and 18B. The magnetic information is input to the system controller 44. Out of the received magnetic information, the system controller 44 sends data concerning the exposure to the AE/AWB arithmetic circuit 42.

A motor M is a driving source for driving the feed rollers 161. A motor driver 39 is a drive circuit for controllably driving the motor M. An iris driver 40 is a drive circuit for controllably opening and closing the iris 22. A CCD driver 41 is a drive circuit for controllably driving the CCD line sensor 23 to pick up the images and to output the image signals. The motor driver 39 is controlled by the system controller 44, and the iris driver 40 and the CCD driver 41 are controlled by the AE/AWB arithmetic circuit 42.

The AE/AWB arithmetic circuit 42 reads, from the picked up film images, the exposure/color correction calculation data used to calculate the exposure control values and the color correction; calculates the exposure control values (aperture value Av and electronic shutter speed Tv), the gain AG of the amplifier 25 and the WB correction value while the film images are picked up; and controls the driving of the iris driver 40 and the CCD driver 41 based on the calculation results.

The AE/AWB arithmetic circuit 42 is controlled by the system controller 44. The AE/AWB arithmetic circuit 42 and the system controller 44 constitute a reading means for reading the density of each film image, a calculating means for calculating exposure control values and image processing conditions under which the image processing is carried out, and a setting means for setting the exposure control values and the image processing conditions based on the calculation result of the calculating means.

More specifically, the system controller 44 reads the orange base data by sensing the orange base area 10E of the film 10 after the film 10 is loaded. Thereafter, the system controller 44 reads the magnetic information while forwarding the film 10 at a high speed, reads the exposure/color correction calculation data and picks up the film images to generate the multi-images while rewinding the film 10 at a middle speed. The system controller 44 then sends the exposure data out of the read magnetic information to the AE/AWB arithmetic circuit 42 and causes this circuit 42 to calculate the exposure control values (Av, Tv), the gain AG of the amplifier 25 and the WB correction value used during the reproduction based on the exposure data, the orange base data and the exposure/color correction calculation data.

Further, the system controller 44 generates the multi-image from the picked up film images of all frames F by means of the address controller 43 and outputs the generated multi-image to the monitor TV 2 to be displayed on the display screen 3.

The AE/AWB arithmetic circuit 42 controls the driving of the iris driver 40 and the CCD driver 41 in accordance with the calculated exposure control values during the reproduction of the film images of the frames F, and carries out an exposure control in picking up the film images. Further, the circuit 42 sends the calculated gain AG and WB correction value respectively to the amplifier 25 and the WB circuit 26, thereby setting the gains of the amplifier 25 and the WB circuit 26.

The address controller 43 calculates addresses of the image data representing the picked up image which are to be stored in the first image memory 29 and the second image memory 32, and functions as a generating means for generating a multi-image and a display control means for controlling display of the multi-image. The circuit 43 calculates addresses for the image data representing the picked up images in accordance with the control signal input from the system controller 44, and outputs the calculation results to the first and second image memories 29 and 32. Further, the circuit 43 controls the reading of the image data stored in the first image memory 29 in accordance with a reading timing pulse input from the system controller 44.

The system controller 44 centrally controls the operation of the film image reproducing unit. The system controller 44 controls the driving of the respective elements in accordance with a program stored in a built-in ROM (read only memory) which specifies the picking up and reproduction of the film images.

The system controller 44 discriminates the information concerning the film from the read magnetic information and controls timings at which the exposure/color correction calculation data is read, the film images are picked up, and the magnetic information is read and written.

Next, there is described a control executed to read the orange base data, the magnetic information, the exposure/color correction calculation data for the respective frames F and to pick up the film images for the multi-image.

There are two different types of winding methods for cameras: normal wind method and pre-wind method. The normal wind method is such that the film is wound frame by frame each time the photographing is performed and the images are recorded one by one from the leading frame toward the last frame. The pre-wind method is such that, when being loaded, the film is wound to the last frame position and the film is rewound frame by frame each time the photographing is performed, and the images are recorded one by one from the last frame toward the leading frame.

Figure 11:
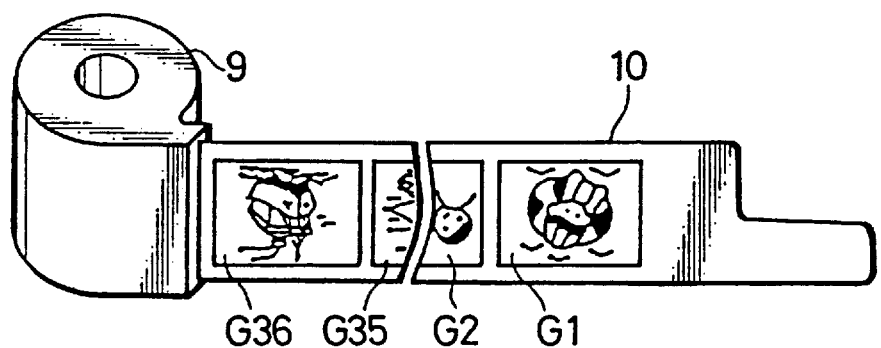
FIG. 11 is a perspective view of a developed film photographed in accordance with a normal wind system.
Figure 12:
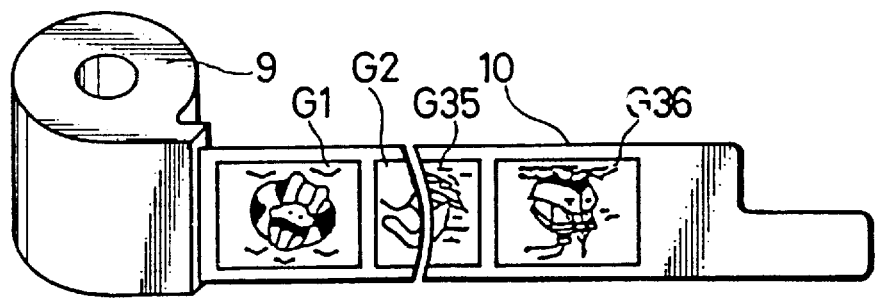
FIG. 12 is a perspective view of a developed film photographed in accordance with a pre-wind system.

FIGS. 11 and 12 show a developed film of thirty six frames. FIG. 11 shows the film when the photographing is performed according to the normal wind method, and FIG. 12 shows the film when the photographing is performed according to the pre-wind method.

As is clear from FIG. 11, the oldest film image G1 is recorded in the leading frame F and the latest image G36 is recorded in the last frame F in the developed film 10 which was exposed according to the normal wind method (hereinafter referred to as a forwardly recorded film). As is clear from FIG. 12, the latest image G36 is recorded in the leading frame F and the oldest image G1 is recorded in the last frame F in the developed film 10 which was exposed according to the pre-wind method (hereinafter referred to as a backwardly recorded film).

The system controller 44 discriminates the kind of the film 10 based on the magnetic information read from the film 10. For example, if the information concerning the kind of the film is directly recorded on the magnetic recording portions 11A and 11B of the film leader 10A, the kind of the film 10 is discriminated based on the read magnetic information. If this information is not directly recorded, the kind of the film 10 is indirectly discriminated based on the dates of photographing which are recorded on the magnetic recording portions 12A and 12B in correspondence with the respective frames F.

Next, description will be made about reading of magnetic information and reproducing of film images.

FIG. 13 is a chart summarily showing a first reading and reproducing manner which is adapted for reading magnetic information and reproducing film images of a forwardly recorded film.

In FIG. 13, bold line arrows Q1 indicate a direction in which the magnetic information and the exposure/color correction calculation data are read and the film images are picked up. In other words, the arrows Q1 indicate a direction in which the magnetic heads 18A and 18B and the CCD line sensor 23 relatively scan the film 10. An arrow Q2 indicates that the film 10 is rewound at a high speed.

Dotted line arrows q1 and thin line arrows q2 indicate contents displayed on the display screen 3 of the monitor TV 2 during the scanning and the rewinding. During a period represented by the arrows q2, the multi-image consisting of the film images of all frames F is displayed (hereinafter, referred to as a collective multi-image display).

When the film cartridge 9 is mounted in the film loader 13, the film 10 is automatically loaded and fed to the film end 10C. The feeding speed of the film 10 is accelerated to a specified speed (high speed) after the loading, and the orange base data is read during this acceleration. The image recording area 10B is scanned in the winding direction at the high speed (first scanning) and the magnetic information is read during the first scanning.

When the film 10 is fed to the film end 10C, the feeding direction is reversed and accelerated to a specified speed (middle speed) which is slower than the feeding speed during the first scanning. Thereafter, the image recording area 10B is scanned in the rewinding direction at this speed (second scanning) and the exposure/color correction calculation data is read and the film images G36 to G1 are picked up to generate the multi-image.

When the film 10 is rewound to the film leader 10A, the feed of the film 10 is stopped. A specified multi-image is generated and collectively displayed on the display screen 3 of the monitor TV 2, thereby bringing the reproducing apparatus 1 into a state where the reproduction conditions are settable and the film images are reproducible.

Thereafter, when the reproduction is designated after the operator sets the reproduction conditions of the film images, the film images of the respective frames F are reproduced on the display screen 3 of the monitor TV 2 in accordance with the set reproduction conditions. During this reproduction, the film images of the selected frames F are picked up one after another (third scanning) while the film 10 is fed from the leading frame F in the winding direction at a specified speed (low speed). The picked up images are reproduced on the display screen 3 of the monitor TV 2 after the specified processings are applied thereto.

When the reproduction of film images of all frames is completed, the film 10 is rewound from the film end 10C at the high speed so that it can be discharged. During the rewinding, the information concerning the newly set reproduction conditions (changed contents of the magnetic information) is renewably recorded on the magnetic recording portions 11A, 11B, 12A and 12B of the film 10.

Figure 14A:
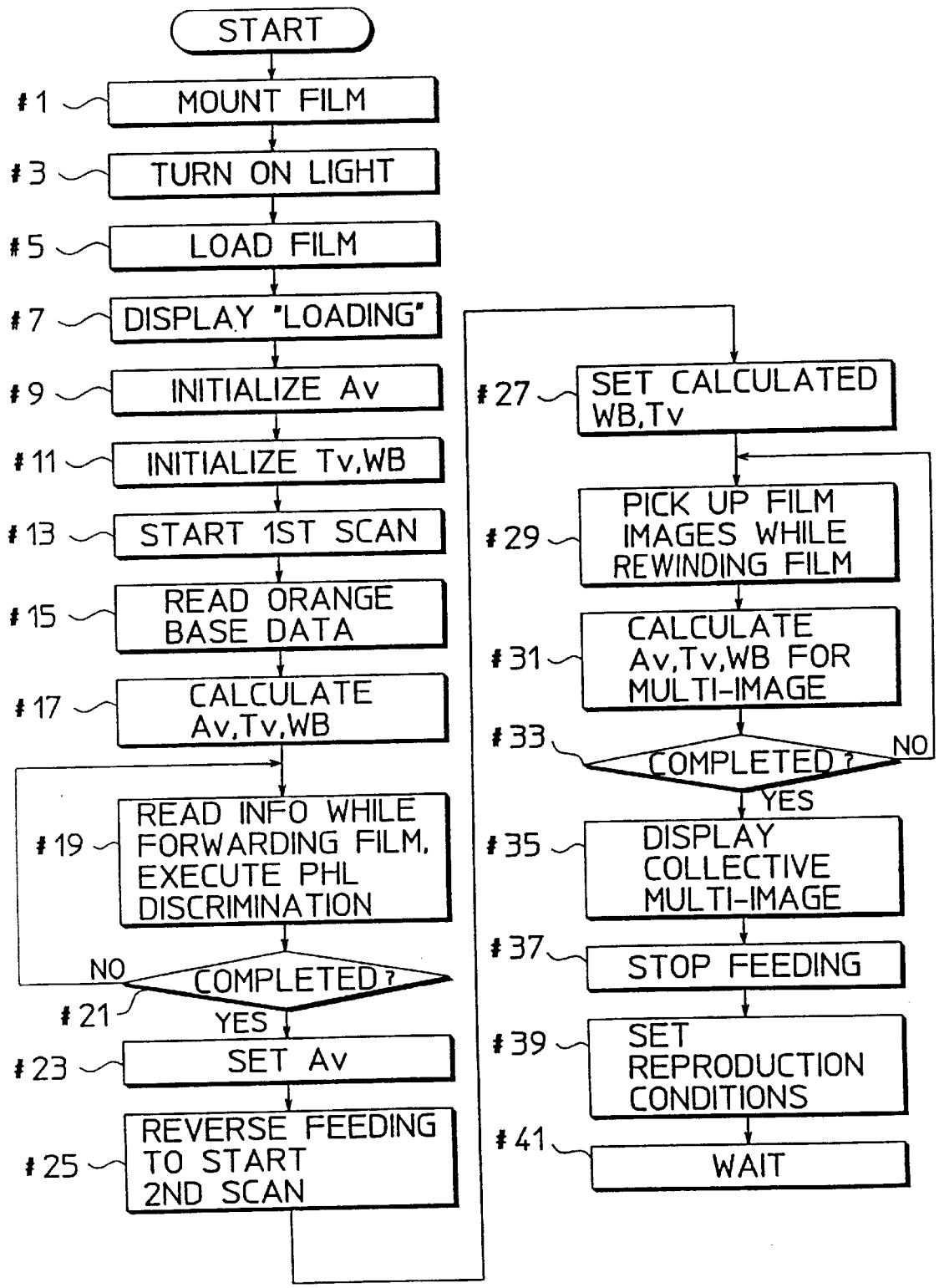
FIGS. 14A and 14B are flowcharts showing the first manner of operations of reading magnetic information of the forwardly recorded film and reproducing film images of the forwardly recorded film.
Figure 14B:
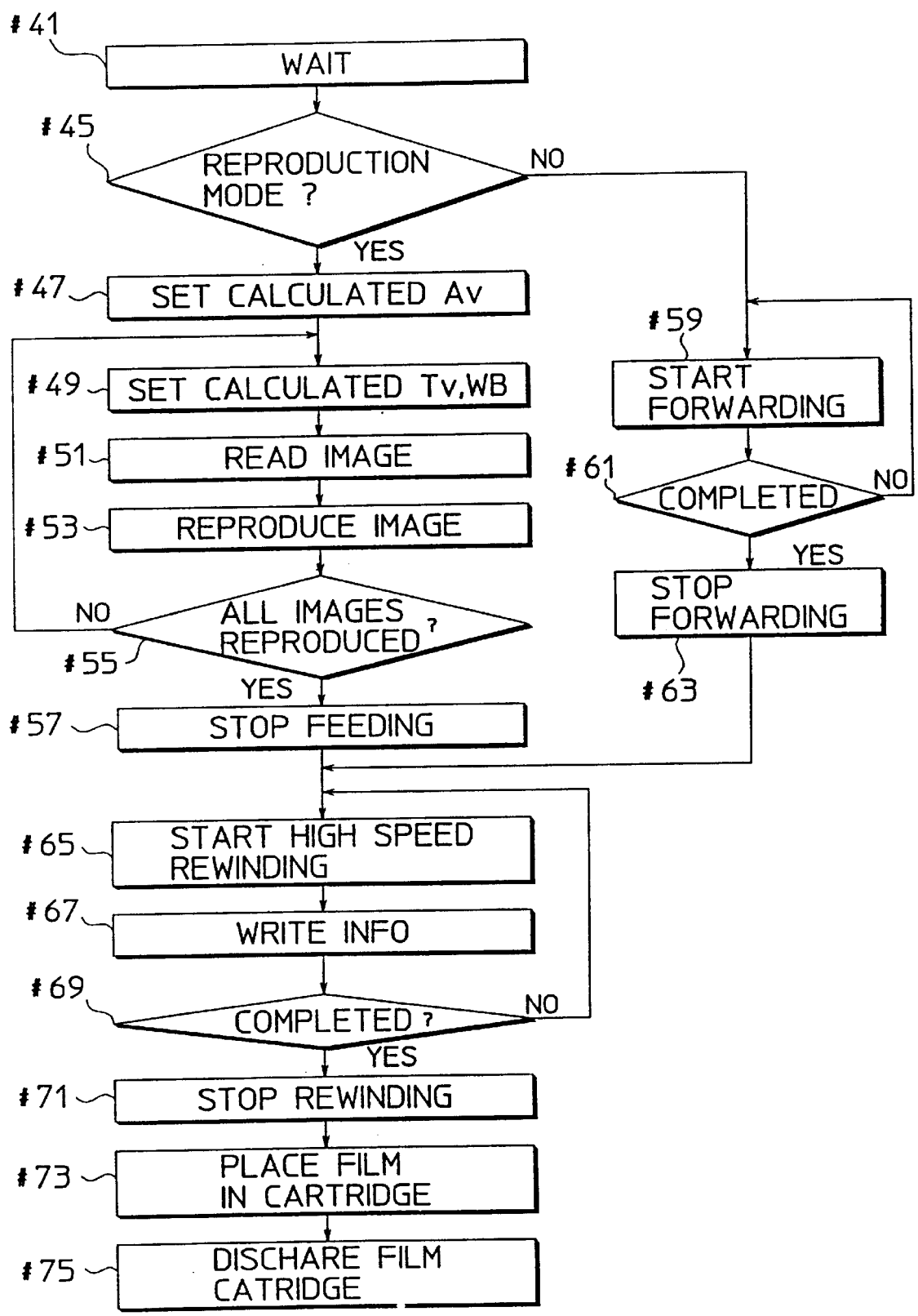

There will be next described operations of reading the magnetic information and reproducing the film images of the forwardly recorded film with reference to flowcharts shown in FIGS. 14A and 14B.

FIG. 14A is a flowchart showing a control of reading the magnetic information of the forwardly recorded film.

When the film cartridge 9 is mounted on the eject table 6 and contained in the film loader 13 (Step #1), the film 10 is loaded (Step #5) after the light source 191 of the illuminating unit 19 is turned on (Step #3). A message "Loading" (indicating that the film 10 is being loaded) is displayed on the display screen 3 of the monitor TV 2 (Step #7).

Subsequently, the aperture value Av, electronic shutter speed Tv and the WB correction value are set to predetermined initial values during the film loading, respectively (Steps #9 and #11). Upon completion of the film loading, the feeding speed of the film 10 is accelerated to the specified high speed in order to read the magnetic information, thereby starting the first scanning (Step #13).

After the orange base data is read by sensing the orange base area 10E (Step #15) and the aperture value Av, the electronic shutter speed Tv and the WB correction value are calculated based an the read orange base data (Step #17), the magnetic information is read from the magnetic recording portions 11A and 11B while forwarding the film 10 at the high speed in the winding direction (Steps #19 and #21). Based on the contents of the read magnetic information, the kind of the film, the size (PHL discrimination) and posture (posture discrimination) of the images to be reproduced are discriminated.

Upon completion of the reading of the magnetic information (completion of the first scanning) (YES in Step #21), the iris 22 is driven to attain the aperture value Av calculated in Step #17 (Step #23), and the feeding direction of the film 10 is reversed to start the second scanning (Step #25).

Upon start of the second scanning, the WB correction value and the electronic shutter speed Tv are set to the respective values calculated in Step #17 (Step #27). Then, the exposure/color correction calculation data are read and the film images for the multi-image are picked up while rewinding the film 10 at the middle speed (Step #29).

Every time the exposure/color correction calculation data are read and the film image is picked up for one frame F, the aperture value Av, electronic shutter speed Tv and WB correction value used to pick up the film images for the multi-image are calculated based on the read exposure/color correction calculation data (Steps #31 and #33).

The aperture value Av, electronic shutter speed Tv and WB correction value are calculated by the AE/AWB arithmetic circuit 42. The circuit 42 predictively calculates the luminance of the film image based on the magnetic information (PHL information, posture information, etc.) and exposure/color correction calculation data of the respective frames F which are inputted from the system controller 44 (predictive light measurement), and calculates the aperture value Av, electronic shutter speed Tv and WB correction value for the respective frames F based on the calculation results.

When the exposure/color correction calculation data are read and the film images are picked up for all frames F (YES in Step #33), the multi-image generated from the picked up images of all frames F is displayed on the display screen 3 of the monitor TV 2 (collective multi-image display) (Step

35) and the rewinding of the film 10 is stopped (end of the second scanning) (Step #37).

As described above, the aperture value Av, electronic shutter speed Tv and WB correction value are fixedly set to the values calculated in Step #17 before the start of the second scanning (see Step #23). These values are not set each time the film image of one frame F is picked up. This is based on the following reasons. Since the exposure/color correction calculation data are read and the film images for the multi-image are picked up during the relatively high speed scanning, it is difficult to set the aperture value of the iris 22 at a high speed each time a film image is picked up. Further, the multi-image is not required to have such high quality as the reproduced images.

Subsequently, the operator is allowed to set the reproduction conditions such as a reproduction order of the respective frames F, posture conversion and clipping while viewing the multi-image displayed on the display screen 3 of the monitor TV 2 (Step #39). Upon completion of the setting of the reproduction conditions, these set conditions are stored in the internal memory of the system controller 44 and the reproducing apparatus 1 waits for the reading of the images to be reproduced.

Figure 15:
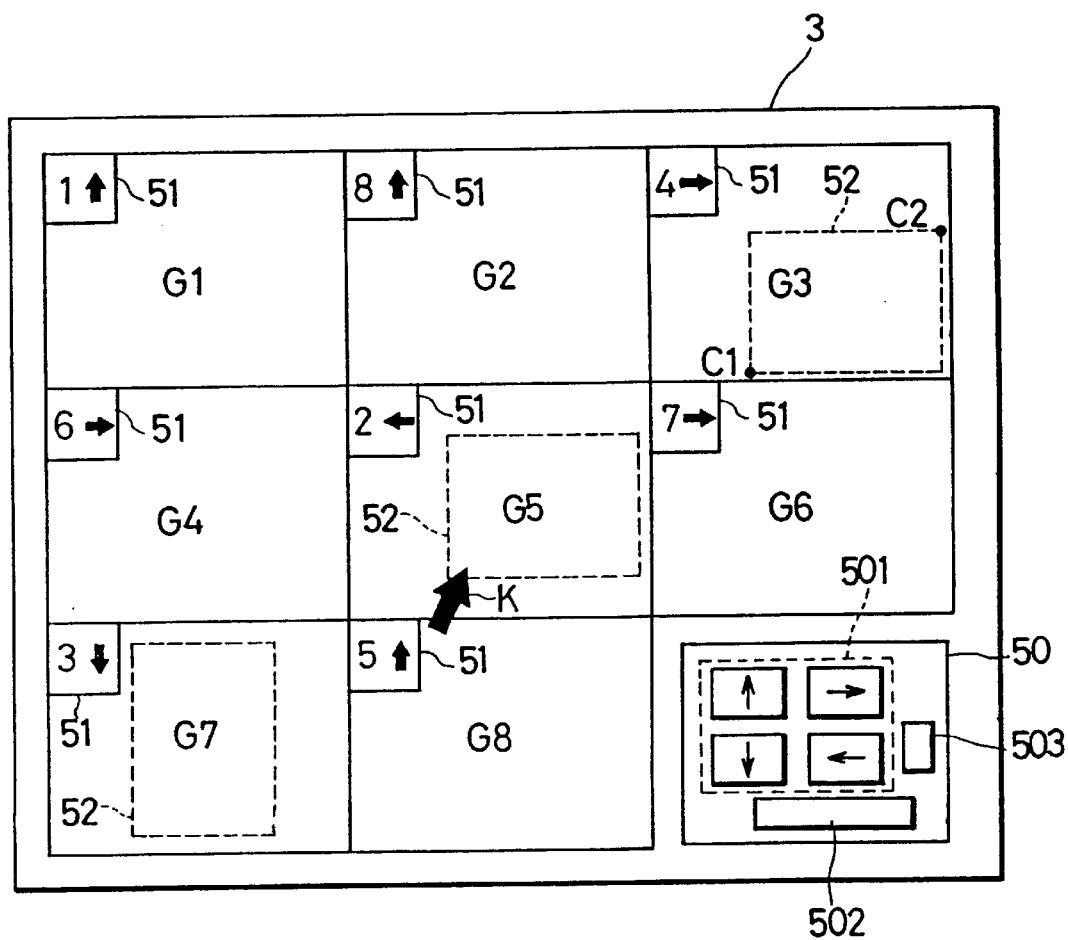
FIG. 15 is a diagram showing an example of a display screen for setting reproduction conditions.

FIG. 15 is a diagram showing an example of a display screen for the setting of reproduction conditions which is executed in Step #41.

In FIG. 15, eight film images are combined into one multi-image and displayed on the display screen 3 of the monitor TV 2, and a dialogue box 50 corresponding to an operation button is displayed at a lower right corner of the display screen 3.

The dialogue box 50 includes a switch 501 for designating directions of the images, an order switch 502 for designating the reproduction order, and an end switch 503 for designating the end of the operation.

In the display screen 3, there is also displayed a cursor K representing the position of a mouse (not shown) externally connected with the film image reproducing apparatus 1.

A reproduction information indicator 51 for displaying the reproduction order and direction is provided at an upper left corner of each image in the multi-image. A number in the indicator 51 indicates the reproduction order and an arrow thereof indicates the direction of the image. For example, an image G1 with the indicator 51 of "1" and an upward facing arrow is first to be reproduced with facing upward.

The direction and reproduction order of the image are set as follows. The cursor K is moved to a desired position of the images G1 to G8 by means of the mouse. After the image is selected by clicking a selection switch of the mouse, the cursor K is moved to a display position of a desired switch 501 or order switch 502 within the dialogue box 50, thereupon the selection switch of the mouse is clicked to select the desired direction or reproduction order.

Rectangular frames 52 of dotted line displayed in the images G3, G5 and G7 indicate a clipping region of each image. The clipping region is set by moving the cursor K to a desired one of the images G1 to G8 and clicking the selection switch of the mouse at two corner positions on a diagonal line of the clipping region (e.g., points C1 and C2 in the image G3).

The setting of the reproduction condition is completed by moving the cursor K to the end switch 503 of the dialogue box 50 and clicking the selection switch of the mouse thereat.

Other reproduction conditions are set in a similar manner by displaying the multi-image and the dialogue box on the display screen 3 of the monitor TV 2 and selecting a variety of conditions by means of the cursor K.

FIG. 14B is a flowchart showing a control of reproducing the film images recorded on the forwardly recorded film.

When the reproduction mode (image reading mode) is set by means of the operation portion 8 in the image reading waiting state (YES in Step #45), the aperture value Av, electronic shutter speed Tv and WB correction value are set to the values for the first frame calculated in Step #31 (Steps #47 and #49). The film image of the first frame to be reproduced is read while the film 10 is fed at the specified low speed in the winding direction (Step #51) and reproduced on the display screen 3 of the monitor TV 2 in accordance with the specified reproduction conditions.

Upon completion of the reproduction of the film image of the first frame, this routine returns to Step #49 and the electronic shutter speed Tv and WB correction value are set to the values for the second frame calculated in Step #31 and the film image of the second frame is picked up similar to the one of the first frame (Step #51). The picked up image is reproduced on the display screen 3 of the monitor TV 2 in accordance with the specified reproduction conditions (Step #53).

Hereafter, the film images of the third and subsequent frames are reproduced in a similar manner (a loop of Steps #49 to #55). When the film images of all frames F to be reproduced are reproduced (YES in Step #55), the film 10 is fed to the film end 10C and the feed thereof is stopped (Step #57).

Subsequently, the high speed rewinding of the film 10 is started (Step #65), and the magnetic information stored in the internal memory of the system controller 44 is renewably recorded on the magnetic recording portions 11A, 11B, 12A and 12B of the film 10 (a loop of Steps #67, #65 to #69).

When the film 10 is rewound to the film leader 10A (YES in Step #69), the feeding speed of the film 10 is decelerated and finally stopped (Step #71). After the film 19 is placed in the film cartridge 9 (Step #73), the eject table 6 is projected from the film loader 13 and the film is discharged (Step #75).

If the reproduction mode is not set (NO in Step #45), this routine proceeds to Step #65 after the film 10 is fed to the last frame at the high speed (a loop of Steps #59 and #61, and Step #63). Then, the magnetic information is renewably stored in the magnetic recording portions 11A, 11B, 12A and 12B while the film 10 is rewound at the high speed (Steps #65 to #75).

During the reproduction, the iris 22 is controllably driven only at the start of the feed of the film 10. Only the electronic shutter speed Tv and WB correction value are set during a period (period $\Delta t$ in FIG. 13) during which the film 10 is fed frame by frame each time one frame of film image is picked up. However, the aperture value Av suitable for each frame F may be set during the period $\Delta t$.

Figure 16:
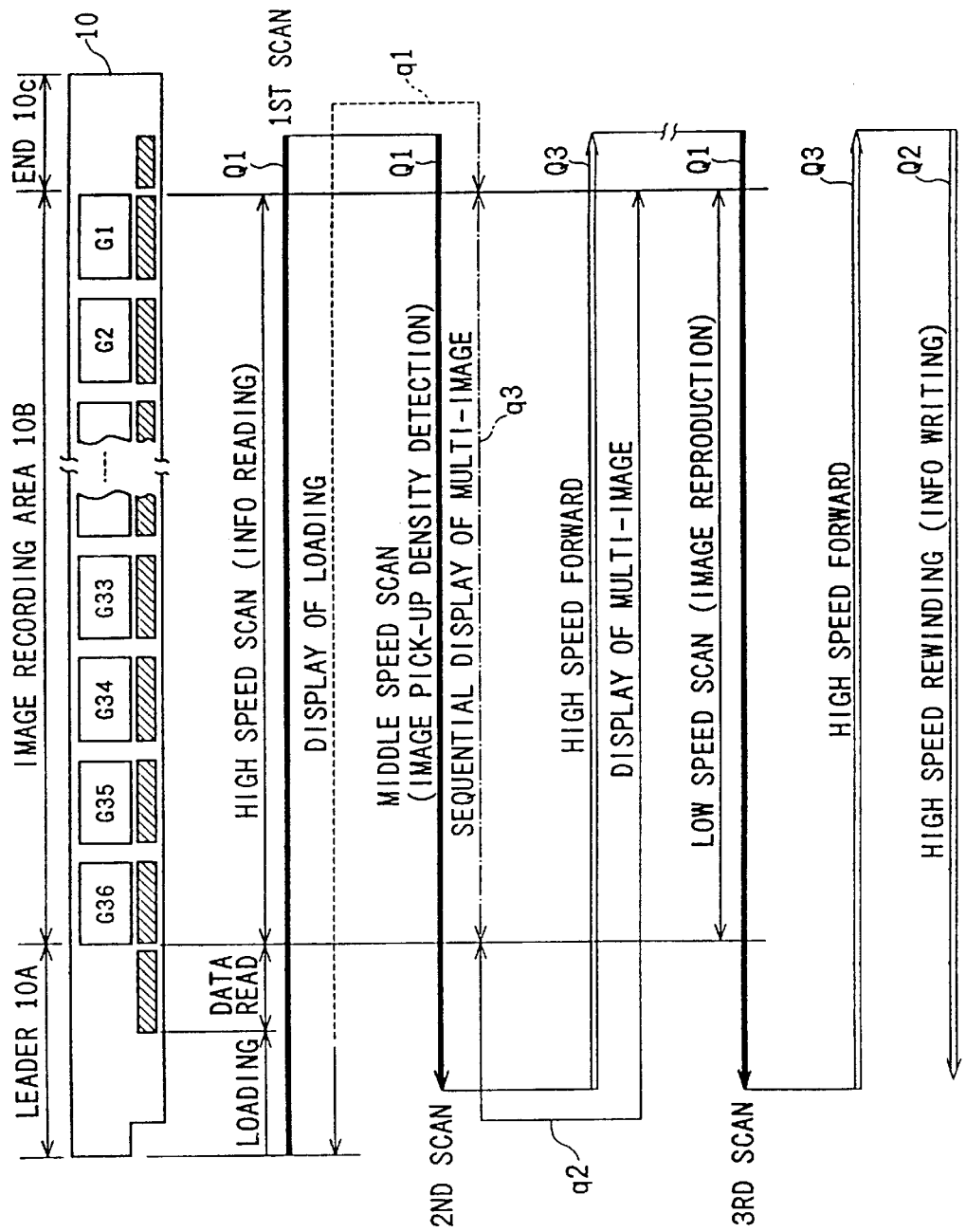
FIG. 16 is a chart summarily showing a second reading and reproducing manner which is adapted for reading magnetic information and reproducing film images of a backwardly recorded film.

FIG. 16 is a chart summarily showing a second reading and reproducing manner which is adapted for reading magnetic information and reproducing film images of a backwardly recorded film.

In FIG. 16, arrows Q1, Q2, q1, and q2 are identical to those in FIG. 13. Arrows Q3 indicate the high speed forwarding of the film 10 without reading the magnetic information and the exposure/color correction calculation data and picking up the film images. An arrow q3 of phantom line indicates that the multi-image is renewably displayed on the display screen of the monitor TV 2 each time the film image of the frame F is picked up (hereinafter, referred to as a sequential multi-image display).

FIG. 20A shows an example of a multi-image stored in the first image memory 29 when the ninth film image is picked up. The picked up images G1 to G9 of the first to ninth frames are combined into a multi-image of (6, 6) matrix pattern.

In the collective multi-image display, the film images of all thirty six frames are picked up and the multi-image obtained by combining these picked up images G1 to G36 (see FIG. 11) is displayed on the display screen 3 of the monitor TV 2. However, as shown in FIG. 20A, in the sequential multi-image display, the multi-image obtained by combining the already picked up film images is displayed on the display screen 3 of the monitor TV 2 each time one frame of film image is picked up.

In the case of the backwardly recorded film, the orange base data and the magnetic information are read during the first scanning, and the exposure/color correction calculation data are read and the film images for the multi-image are picked up during the second scanning. In this case, the magnetic information is recorded while the film 10 is rewound at the high speed in the end as in the forwardly recorded film. However, since the sequential multi-image display method is adopted as the display method of the multi-image (see the arrow q3 in FIG. 16), upon completion of the second scanning, the film 10 is fed to the film end 10C at the high speed in order to enable the reproduction of the film image G1 of the first frame during the reproduction of the film images. Upon completion of the reproduction of the film images, the film 10 is fed to the film end 10C at the high speed to record the magnetic information (see the arrow Q3 in FIG. 16).

The sequential multi-image display method is adopted for the backwardly recorded film for the following reason. The film images on the backwardly recorded film are picked up in the order of G1, G2, . . . , G36 and the multi-image is generated from the leading frame to the last frame. Accordingly, the incongruity the operator feels concerning the operation is reduced by sequentially displaying the multi-image on the display screen of the monitor TV 2.

More specifically, it takes a relatively long time until the reading of the film image for the multi-image and the exposure/color correction calculation data are completed after the film cartridge 9 is mounted in the film loader 13. If only the message "Loading" is displayed during this period, the operator may have a sense of incongruity concerning the operation. Thus, this sense of incongruity is reduced by switching to the display of the multi-image as soon as possible.

The sequential multi-image display method may be adopted for the forwardly recorded film. However, the film images are picked up in the order of G36, G35, . . . , G1 from the forwardly recorded film and the multi-image is generated from the last frame to the leading frame. Accordingly, if the sequential multi-image display method is adopted, the multi-image displayed on the display screen 3 of the monitor TV 2 becomes unnatural. Thus, in this embodiment, the collective multi-image display method is adopted for the forwardly recorded film.

The high speed forwarding indicated by the arrow Q3 is performed because the arrangement direction of the film images G1 to G36 of the backwardly recorded film is opposite from that of the forwardly recorded film.

Figure 17A:
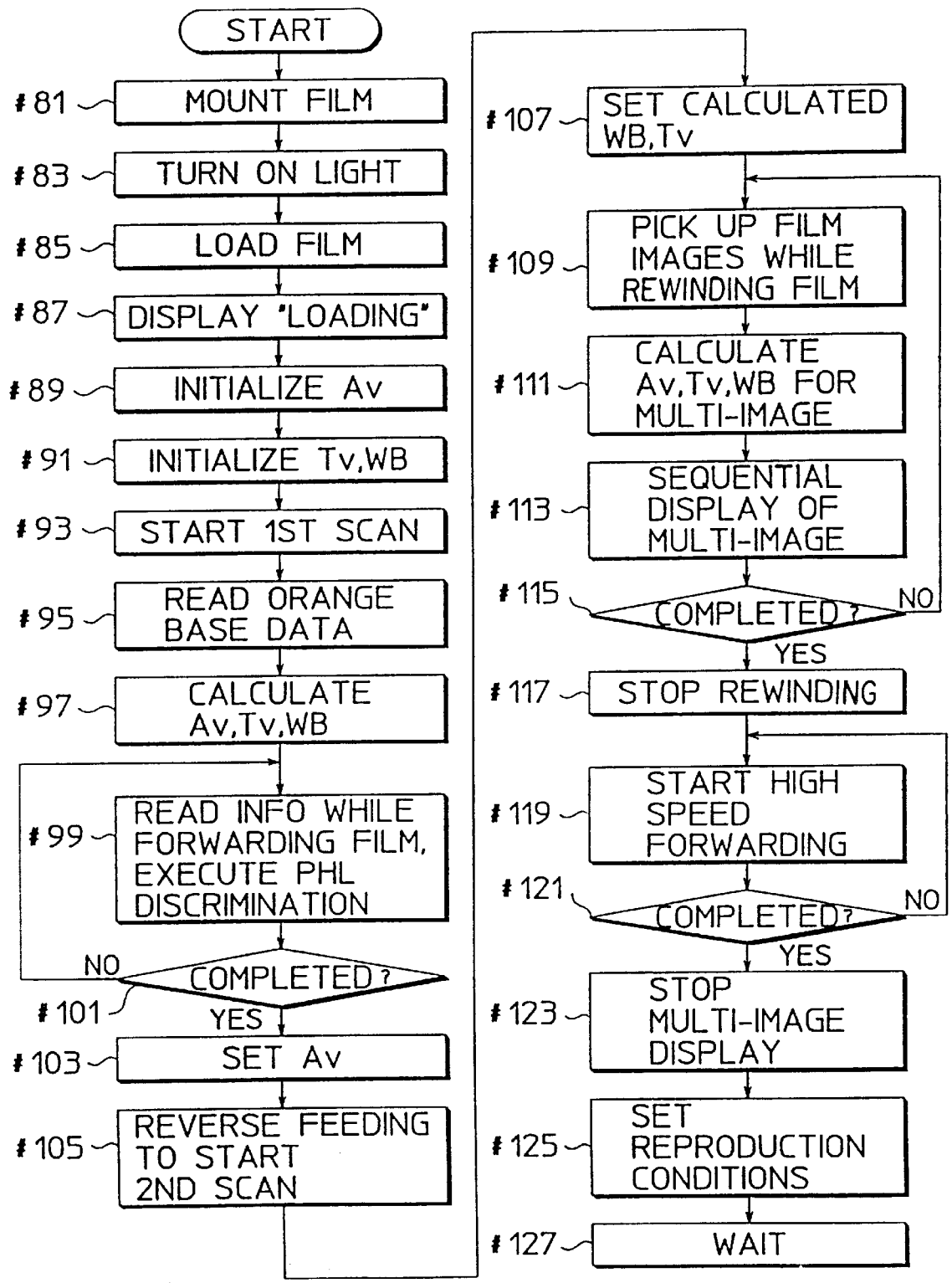
FIGS. 17A and 17B are flowcharts showing the second manner of operations of reading magnetic information and reproducing film images of the backwardly recorded film.
Figure 17B:
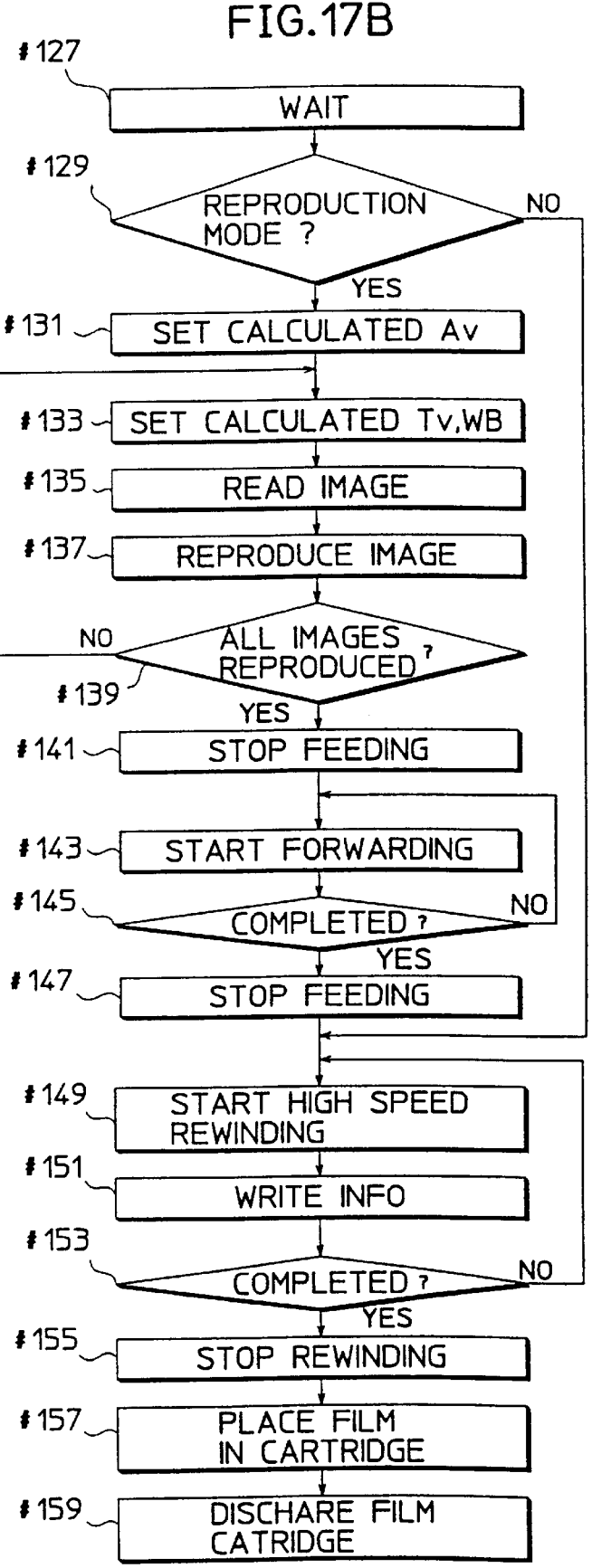

There is described operations of reading the magnetic information and reproducing the film images for the backwardly recorded film with reference to flowcharts shown in FIGS. 17A and 17B.

FIG. 17A is a flowchart showing a control of reading the magnetic information, etc., recorded on the backwardly recorded film.

The operation procedure shown in FIG. 17A is basically identical to the one shown in FIG. 14A. The operations in Steps #81 to #111, #115, #117, #125 and #127 correspond to the operations in Steps #1 to #31, #33, #37, #39 and #41. FIG. 17A differs from FIG. 14A in that, because of the above-described difference, an operation of "Sequential Multi-Image Display" is provided in Step #113 in place of "Collective Multi-Image Display" in Step #35 and an operation of "High Speed Forwarding" is provided in Steps #119 and #121.

Here, the operations identical to those shown in FIG. 14A are only briefly described and the different operations are supplementarily described.

After the film 10 in the film cartridge 9 mounted in the film loader is automatically loaded (Steps #81 to #87), the orange base data and the magnetic information are read during the first scanning (Steps #89 to #101). Subsequently, the iris 22 is driven to attain a specified aperture value Av calculated in Step #97 (Step #103), and the feeding direction of the film 10 is reversed to start the second scanning (Step #105).

Upon start of the second scanning, the electronic shutter speed Tv and WB correction value are set to the values calculated in Step #97 (Step #107). Thereafter, the exposure/color correction calculation data are read and the film images are picked up for the respective frame F to generate the multi-image while the film 10 is rewound at the middle speed (Step #109).

Every time the exposure/color correction calculation data are read and the film image is picked up for one frame F, the aperture value Av, electronic shutter speed Tv and WB correction value used during the reproduction are calculated based on the read exposure/color correction calculation data, and the multi-image is generated from the picked up images sequentially displayed on the display screen 3 of the monitor TV 2 (Steps #111 to #115).

When the exposure/color correction calculation data are read and the film images for the multi-image are picked up for all frames F (YES in Step #115), the rewinding of the film 10 is stopped (end of the second scanning, Step #117).

Subsequently, the film 10 is forwarded to the film end 10C at the high speed (Steps #119, #121) and the display of the multi-image is stopped (Step #123). Thereafter, the operator is allowed to set the reproduction conditions such as the reproduction order of the respective frames F, posture conversion and clipping while viewing the multi-image displayed on the display screen 3 of the monitor TV 2 (Step #125). Upon completion of the setting of the reproduction conditions, these set conditions are stored in the internal memory of the system controller 44 and the reproducing apparatus 1 waits for the reading of the images to be reproduced (Step #127).

FIG. 17B is a flowchart showing a control of reproducing the film images of the backwardly recorded film.

The operation procedure shown in FIG. 17B is basically identical to the one shown in FIG. 14B. The operations in Steps #129 to #141, #149 to #159 correspond to the operations in Steps #45 to #57, #65 to #75, respectively. FIG. 17B differs from FIG. 14B in that, because of the above-described difference, the high speed forwarding corresponding to the one performed in Steps #59 to #63 is not found, but the high speed forwarding is performed between Steps #141 and #149.

Here, the operations identical to those shown in FIG. 14B are only briefly described and the different operations are supplementarily described.

When the reproduction mode (image reading mode) is set by means of the operation portion 8 in the image reading waiting state (YES in Step #129), the film images of the frames F to be reproduced are picked up while the film 10 is fed at the specified low speed in the winding direction, the picked up images are reproduced one after another on the display screen 3 of the monitor TV 2 in accordance with the set presentation conditions (a loop of Steps #131 to #139). Upon completion of the reproduction of the film images of all frames F to be reproduced (YES in Step #139), the feed of the film 10 is stopped (Step #141).

Subsequently, the film 10 is forwarded at the high speed (a loop of Steps #143 and #145) and the feed thereof is stopped when it is fed to the film end 10C (Step #147). Then, the high speed rewinding of the film 10 is started (Step #149), and the magnetic information stored in the internal memory of the system controller 44 is renewably recorded in the magnetic recording portions 11A, 11B, 12A and 12B of the film 10 during this rewinding period (a loop of Steps #151, #149 to #153).

The feed of the film 10 is stopped (Step #155) when the film 10 is rewound to the film leader 10A (YES in Step #153). After the film 10 is contained in the film cartridge 9 (Step #157), the eject table 6 is discharged from the film loader 13 (Step #159).

If the reproduction mode is not set (NO in Step #129), this routine proceeds to Step #149 because the film 10 has already been forwarded to the film end 10C. The magnetic information is renewably recorded on the magnetic recording portions 11A, 11B, 12A and 12B while the film 10 is rewound at the high speed (Steps #149 to #159).

During the reading of the film images of the backwardly recorded film to generate the multi-image, the sequentially multi-image display is made during the second scanning and the multi-image consisting of images of all frames F is displayed (the same as the collective multi-image display) during a period which lasts until the film 10 is forwarded at the high speed to the film end 10C after completion of the second scanning (see FIG. 16).

Figure 18:
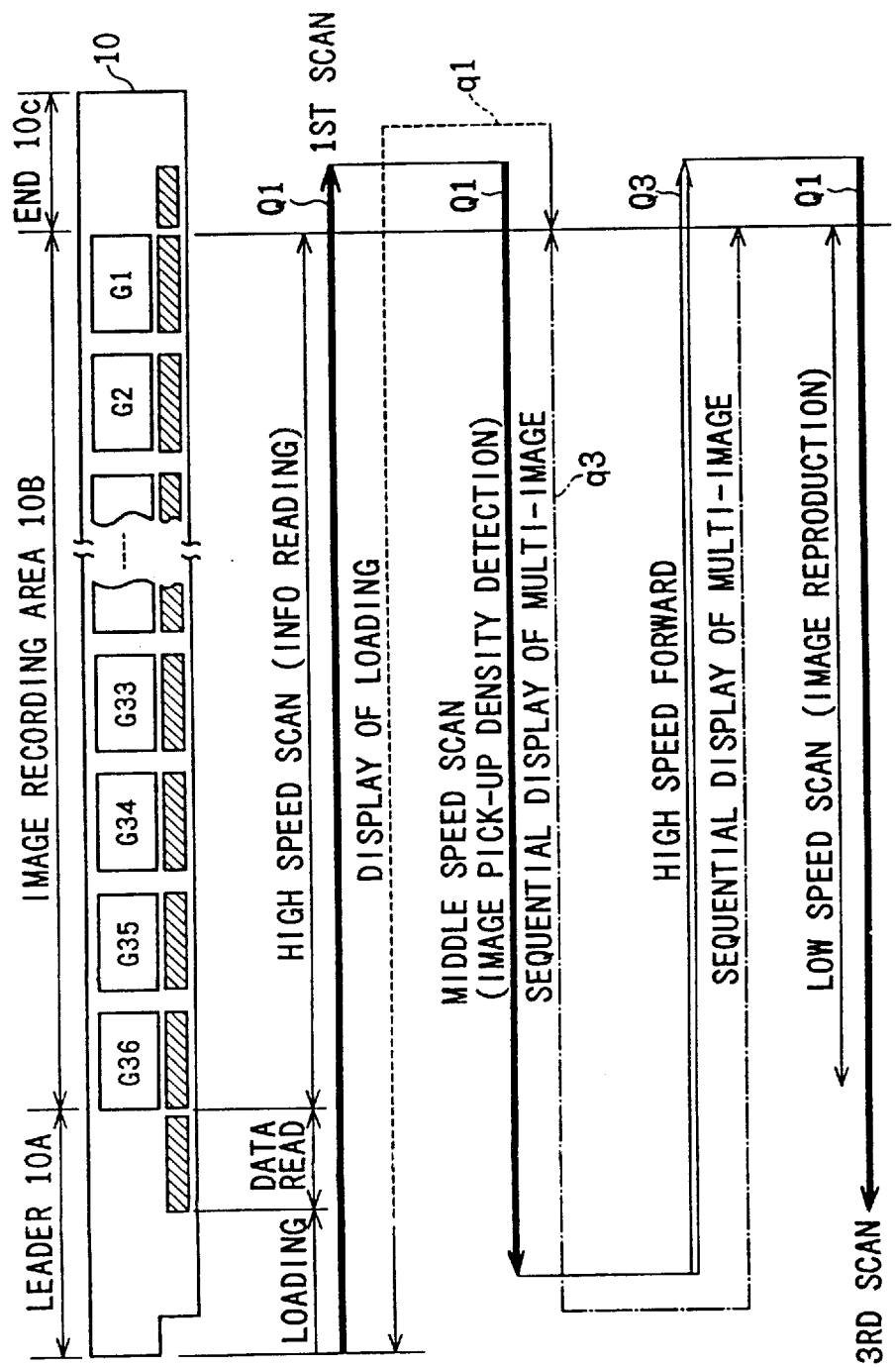
FIG. 18 is a chart summarily showing a third reading and recording manner which is adapted for reading magnetic information and reproducing film images of a backwardly recorded film.

FIG. 18 is a chart summarily showing a third reading and recording manner which is adapted for reading magnetic information and reproducing film images of a backwardly recorded film. In this manner, sequential multi-image display is made during the second scanning and the high speed forwarding of the film 10.

Even if the sequential multi-image display is made only during the second scanning, the operator is not allowed to set the reproduction conditions and reproduce the images even if the collective multi-image display is made while the film 10 is forwarded at the high speed to the film end 10C. This gives the operator a sense of incongruity. However, if the sequential multi-image display is made during the second scanning and the high speed forwarding of the film 10, the operator is allowed to make a further operation immediately after completion of the multi-image display. Thus, the operator will not have the above sense of incongruity.

Figure 19:
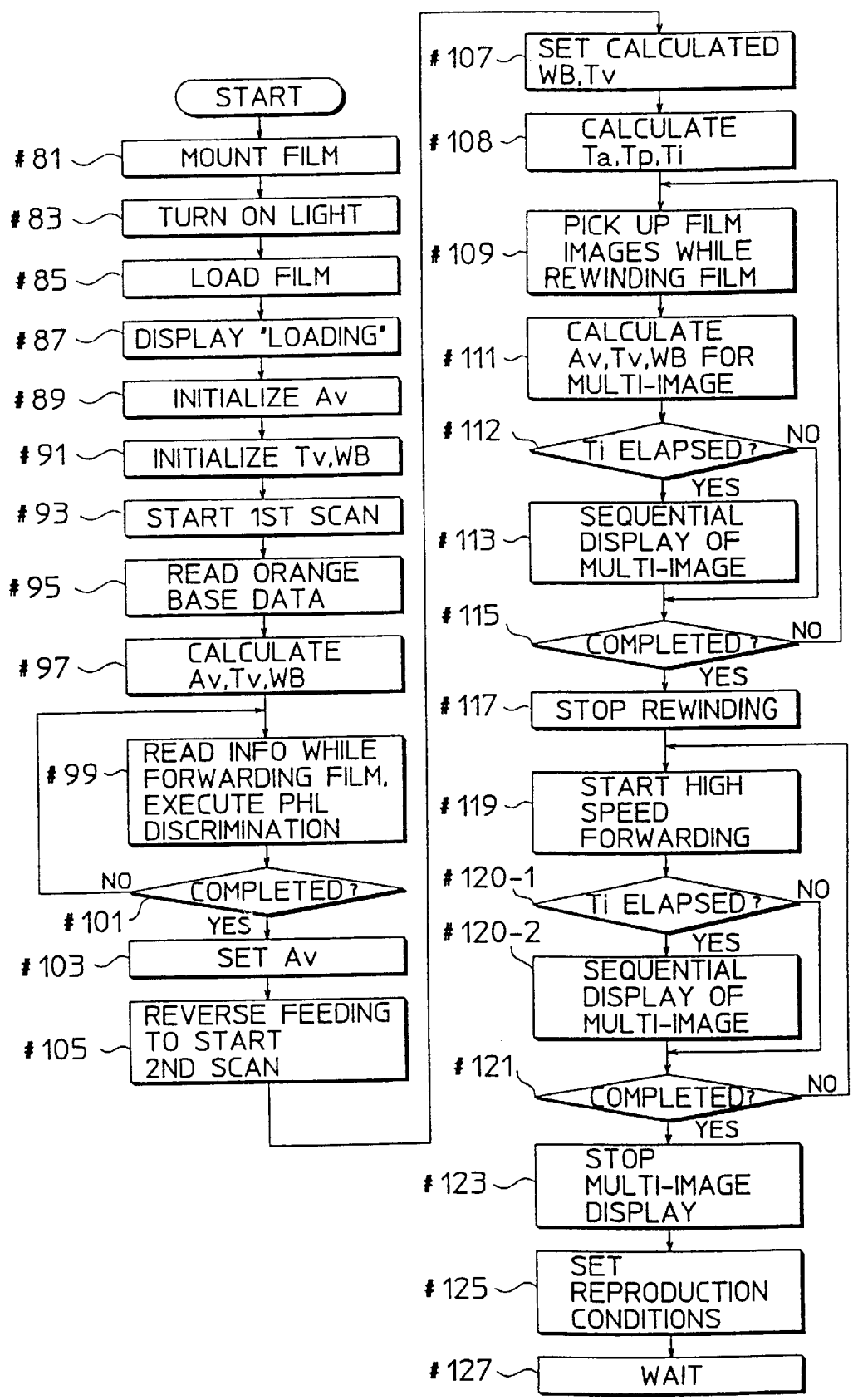
FIG. 19 is a flowchart showing operations of reading magnetic information of the backwardly recorded film in the third manner.

FIG. 19 is a flowchart showing a control of reading the magnetic information of the backwardly recorded film, in which the sequential multi-image display is made during the second scanning and the high speed forwarding of the film.

FIG. 19 differs from FIG. 17A in that: there are added an operation of calculating a display time Ti of displaying the respective multi-images in the sequential multi-image display (Step #108); an operation of designating a display timing for the respective multi-images during the second scanning (Step #112); and an operation of designating the display timing for the respective multi-images during the high speed forwarding of the film 10 (Steps #120-1 and #120-2).

Here, the operations identical to those shown in FIG. 14B are only briefly described and the added operations are supplementarily described.

After the film 10 in the film cartridge 9 mounted in the film loader is automatically loaded (Steps #81 to #87), the orange base data and the magnetic information are read during the first scanning (Steps #89 to #101). Subsequently, the iris 22 is driven to attain a specified aperture value Av calculated in Step #97 (Step #103), and the feeding direction of the film 10 is reversed to start the second scanning (Step #105).

Upon start of the second scanning, the electronic shutter speed Tv and WB correction value are set to the values calculated in Step #97 (Step #107). Subsequently, the display period Ti for each multi-image to conduct the sequential multi-image display is calculated during the high speed forwarding of the film 10 during and after the second scanning. If Ta denotes a duration of the second scanning, Tp denotes a period which lasts until the high speed forwarding of the film 10 after completion of the second scanning, and Nk denotes a total number of frames, the display period Ti is calculated as follows: $Ti=(Ta+Tp)/Nk$.

Subsequently, the counting of a timer built in the system controller 44 is started, and the exposure/color correction calculation data are read and the film images for the multi-image are picked up while the film 10 is rewound at the middle speed (Step #109).

Every time the exposure/color correction calculation data are read and the film image is picked up for one frame F, the aperture value Av, electronic shutter speed Tv and WB correction value used during the reproduction are calculated based on the read exposure/color correction calculation data (Step #111), and the multi-image is generated from the picked up images and sequentially displayed on the display screen 3 of the monitor TV 2 (a loop of Steps #109 to #115). At this time, the display of the multi-images is switched upon each lapse of the display period Ti regardless of the reading timing of the film images of the respective frames F.

The sequential display of the respective multi-images is controlled by controlling the reading timing of the multi-image from the first image memory 29 to the second image memory 32.

FIGS. 20A and 20B are diagrams showing examples of a multi-image in the sequential multi-image display, FIG. 20A showing a composition of a multi-image stored in the first image memory 29 and FIG. 20B showing a composition of a multi-image stored in the second image memory 32.

After specified signal processings are applied to the film images of the respective frames F picked up during the second scanning, these images are combined in a specified pattern and stored in the first image memory 29. FIG. 20A shows the multi-image stored in the first image memory 29 when the film image of the ninth frame is picked up, in which the film images G1 to G9 are combined in the (6, 6) matrix pattern.

Since each multi-image is displayed on the display screen 3 of the monitor TV 2 only during the display period Ti during the second scanning and the high speed forwarding of the film 10, the display timing of each multi-image is delayed from the reading timing of the film image of each frame F. For example, if it is assumed that a multi-image obtained by combining the film images G1 to G6 of the first to sixth frames is displayed on the display screen 3 of the monitor TV 2 when the film image of the ninth frame is read, the multi-image shown in FIG. 20B is read from the first image memory 29, stored in the second image memory 32 and displayed on the display screen 3.

More specifically, all the film images stored in the first image memory 29 without the film images G7 to G9 are read and stored in the second image memory 32 and are generated into a multi-image to be displayed. The system controller 44 causes the address controller 43 to carry out a control to generate the multi-image.

Referring back to FIG. 19, after the exposure/color correction calculation data are read and the film images are picked up for all frames F (YES in Step #115), the rewinding of the film 10 is stopped (Step #117).

Subsequently, the film 10 is forwarded to the film end 10C at the high speed (Steps #111 to #121). The specified multi-images are sequentially displayed, each being displayed during the display period Ti, during this high speed forwarding of the film 10.

Upon completion of the high speed forwarding of the film 10 (YES in Step #121), the sequential multi-image display is stopped (Step #123). Subsequently, the operator is allowed to set the reproduction conditions such as the reproduction order of the respective frames F, posture conversion and clipping while viewing the multi-image displayed on the display screen 3 of the monitor TV 2 (Step #125). Upon completion of the setting of the reproduction conditions, these set conditions are stored in the internal memory of the system controller 44 and the reproducing apparatus 1 waits for the reading of the images to be reproduced (Step #127).

With the backwardly recorded film, upon completion of the reproduction of the film images, the magnetic information is written while the film 10 is rewound at the high speed after the film 10 is forwarded to the film end 10C at the high speed. However, the magnetic information may be written when the film 10 is forwarded at the high speed to reproduce the film images after the exposure/color correction calculation data are read and the film images for the multi-image are picked up (see Q3 in FIGS. 16 and 18).

In this case, Steps #147 to #155 are deleted from the flowchart of FIG. 17B and an operation step of writing the magnetic information is added between Steps #143 and #145. This obviates the need for a round of high speed forwarding of the film 10, thereby making the writing of the magnetic information more efficient, enabling high speed processing, and simplifying the control. The damage of the film 10 caused by the scanning can also be reduced.

In the first to third manner, as mentioned above, an actual image density of each film image is detected to set suitable exposure control values for picking up of film images for reproduction of film image. Accordingly, comparing to the case where the exposure control values are determined only based on the magnetic information, the film images can be reproduced more clearly.

Also, the picking up of film image for generation of multi-image is executed at the same time as the detecting of image density to reduce the processing time before generation of multi-image.

Figure 21:
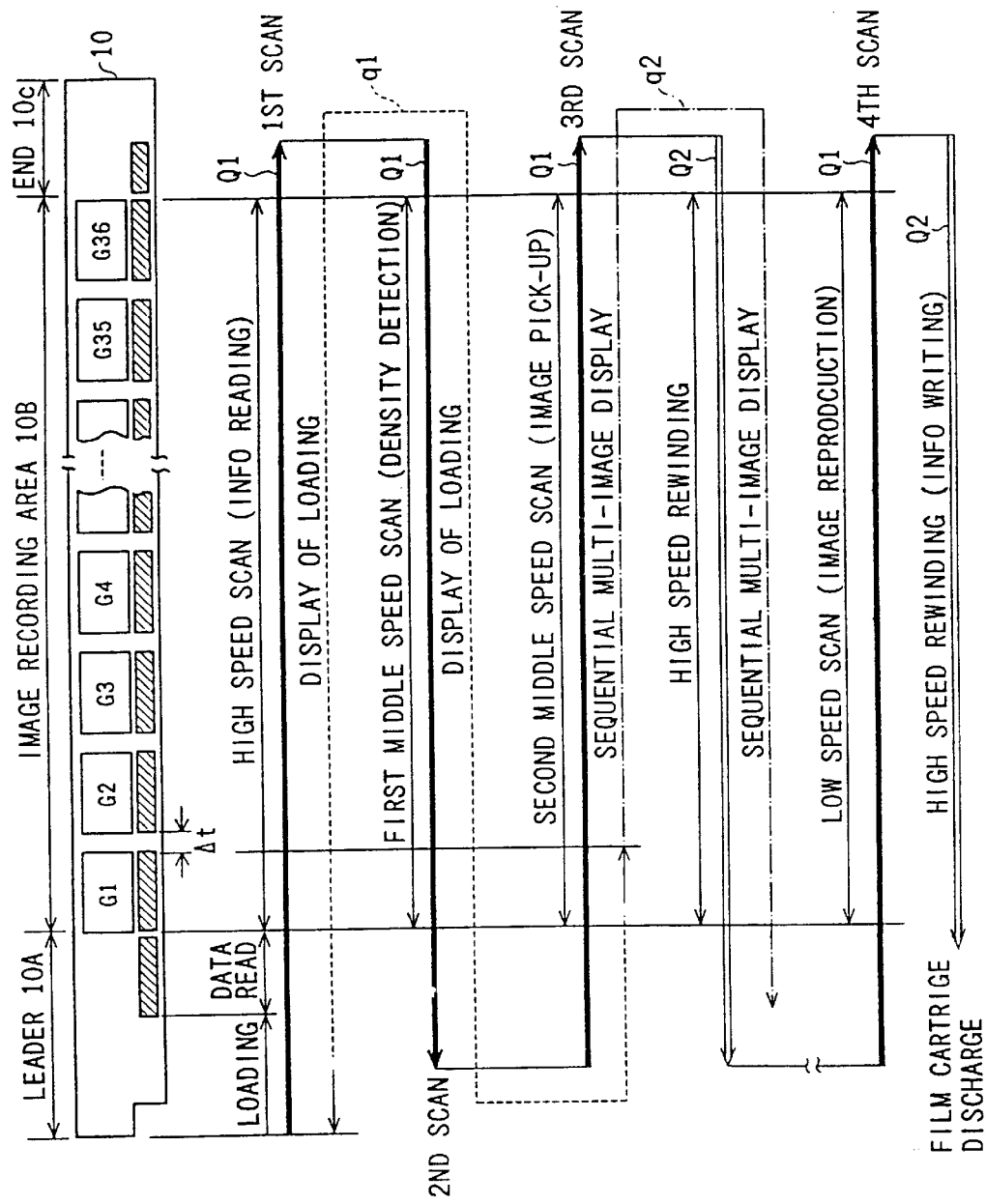
FIG. 21 is a chart summarily showing a fourth reading and reproducing manner which is adapted for reading magnetic information and reproducing film images of a forwardly recorded film.

FIG. 21 is a chart summarily showing a fourth reading and reproducing manner which is adapted for reading magnetic information and reproducing film images of a forwardly recorded film. In this manner, the sequential multi-image display is executed in the third scanning and the high-speed rewinding.

In the fourth reading and reproducing manner, reading of the magnetic information, detecting of image density, and picking up of film image for multi-image are executed at their respective suitable speeds, i.e., in the first, second, and third scannings.

The detecting of image density is executed before the picking up of film images for generation of multi-image to calculate exposure control values suitable to each film image. The picking up of each film image is executed at the suitable exposure control values. Accordingly, a clearer multi-image can be displayed.

Comparing to the first to third manners, this manner will increase the processing time to some extent. However, the detecting of image density and the generating of multi-image can be executed at their respective suitable speeds to provide a clearer multi-image and reproduced film image.

Specific manner is as follows. Similarly to the first manner, when the film cartridge 9 is mounted in the film loader 13, the film 10 is automatically loaded and fed to the film end 10C. The feeding speed of the film 10 is accelerated to a specified speed (high speed) after the loading, and the orange base data are read during this acceleration. The image recording area 10B is scanned in the winding direction at the high speed (first scanning) and the magnetic information is read during the first scanning.

When the film 10 is fed to the film end 10C, the feeding direction is reversed and accelerated to a first middle speed which is slower than the feeding speed during the first scanning. The image recording area 10B is scanned in the rewinding direction at this speed (second scanning) and the exposure/color correction calculation data are read.

When the film 10 is fed to the film leader 10A, the feeding direction is again reversed and accelerated to a second middle speed which is slower than the first middle speed. The image recording area 10B is scanned in the winding direction at the second middle speed (third scanning) and the film images G1 to G36 are picked up to generate the multi-image.

After the film images G1 to G36 are entirely picked up, the film 10 is rewound at the high speed to the film leader 10A and the feed of the film 10 is stopped. Consequently, the reproducing apparatus 1 is brought into a state where the reproduction conditions are settable and film images are reproducible.

The message "Loading" is displayed on the display screen 3 of the monitor TV 2 during the first and second scannings. Sequential multi-images are displayed on the display screen 3 during the third scanning and the high speed rewinding.

In this manner, three scannings are executed until the film images G1 to G36 are completely picked up, which needs a longer time, and makes the collective multi-image display improper.

Thereafter, when the reproduction is designated after the operator sets the reproduction conditions of the film images, the film images of the respective frames F are reproduced on the display screen 3 of the monitor TV 2 in accordance with the set reproduction conditions. During this reproduction, the film images of the selected frames F are picked up one after another (fourth scanning) while the film 10 is fed from the leading frame F in the winding direction at a low speed. The picked up images are reproduced on the display screen 3 of the monitor TV 2 after the specified processings are applied thereto.

When the reproduction of film images of all frames is completed, the film 10 is rewound from the film end 10C at the high speed. During the rewinding, the information concerning the newly set reproduction conditions (changed contents of the magnetic information) is renewably recorded on the magnetic recording portions 11A, 11B, 12A and 12B of the film 10.

Figure 22:
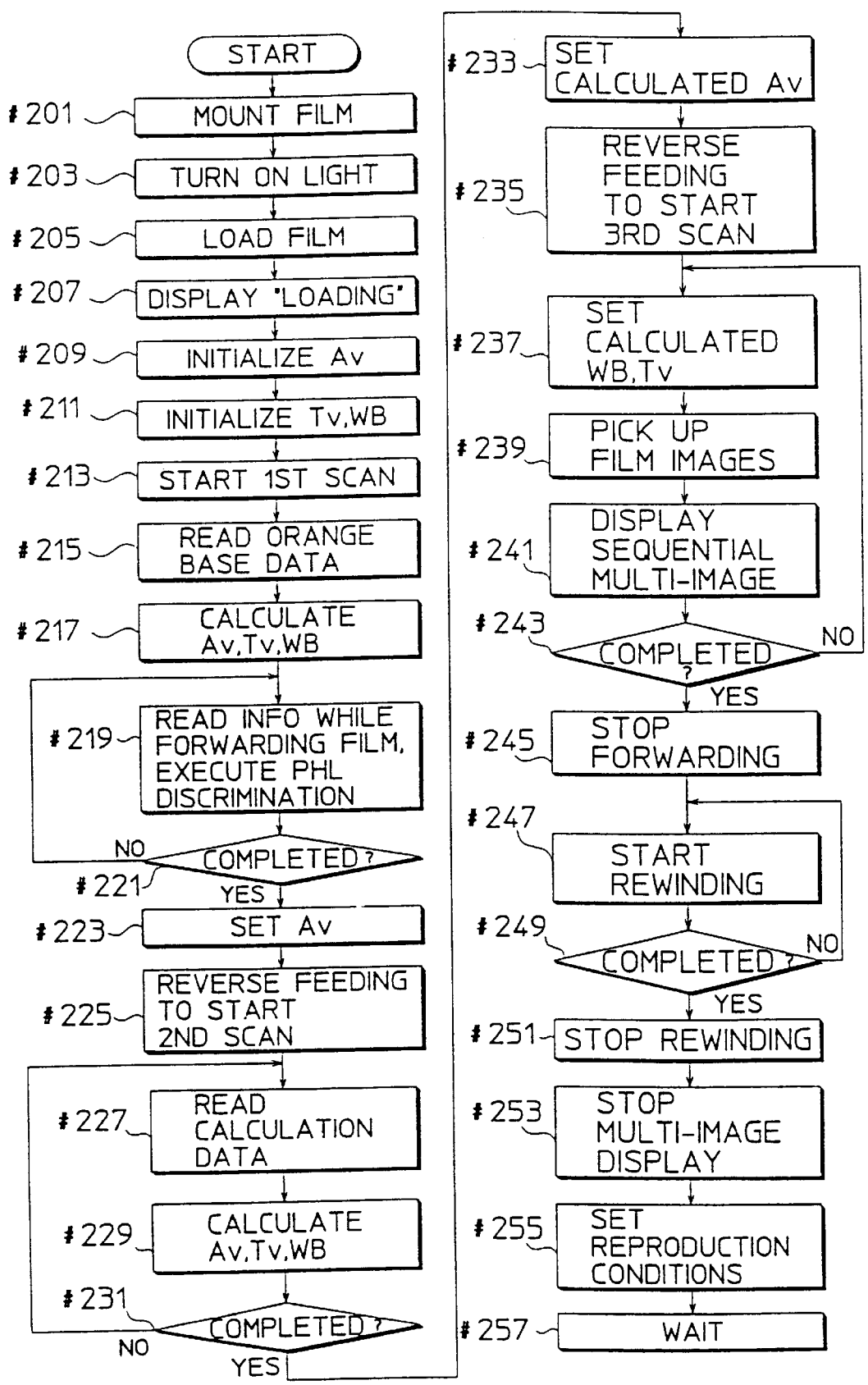
FIG. 22 is a flowchart showing operations of reading magnetic information of the forwardly recorded film in the fourth manner.

FIG. 22 is a flowchart of reading magnetic information in the fourth reading and reproducing manner. Operations of Steps #201 to #225 of this routine are identical to the operations of Steps #1 to #25 of the first manner shown in FIG. 14A.

However, after the first scanning is completed, different operations are executed. After the first scanning, the feeding direction of the film 10 is reversed to start the second scanning (Step #225). The second scanning is executed at the first middle speed. Upon start of the second scanning, the exposure/color correction calculation data are read and the aperture value Av, electronic shutter speed Tv and WB correction value used to pick up the film images for the multi-image are calculated based on the read exposure/color correction calculation data (Steps #227 to #231).

When the exposure/color correction calculation data are read and the film images are picked up for all frames F (YES in Step #231), the iris 22 is driven to attain the aperture value Av calculated in Step #229 (Step #233), and the feeding direction of the film 10 is reversed to start the third scanning (Step #235). The third scanning is executed at the second middle speed.

Upon start of the third scanning, the WB correction value and the electronic shutter speed Tv are set to the respective value calculated in Step #229 (Step #237). Then, the film images for the multi-image are picked up while forwarding the film 10 at the second middle speed, and multi-images are sequentially displayed on the display screen 3 (Steps #239 to #243).

As shown in FIG. 21, the sequential multi-image display is executed in the first scanning Q1 and the high-speed rewinding Q2. In the sequential multi-image display, the multi-image may be renewably displayed on the display screen 3 each time the film image of the frame F is picked up. Also, it may be appreciated to provide a delay time to display some averaged multi-images instead of displaying sequential multi-images immediately after the picking up of film image of each frame.

When the picking up of all the film images for the multi-image display is completed or the third scanning is completed (YES in Step #243), the forwarding of the film 10 is stopped (Step #245). In the third scanning, the aperture value Av, electronic shutter speed Tv and WB correction value are fixedly set to the values calculated in Step #229 before the start of the third scanning. These values are not set each time the film image of one frame F is picked up. This is because: the reading of calculation data and picking up the film images for the multi-image are executed at the relatively high speed; this makes it difficult to set the aperture value of the iris 22 at a high speed each time the film image is picked up; and the multi-image is not required to have such high quality as the reproduction of images.

Subsequently, the film 10 is rewound to the film leader 10A at the high speed (Step #247 to #249). In this high speed rewinding, the sequential multi-image display is executed. After the sequential multi-image display (Step #253), the operator is allowed to set the reproduction conditions while viewing the multi-image displayed on the screen 3 (Step #255). These set conditions are stored in the internal memory and the apparatus waits for the reading operation of the film images which is shown in FIG. 14B.

Figure 23:
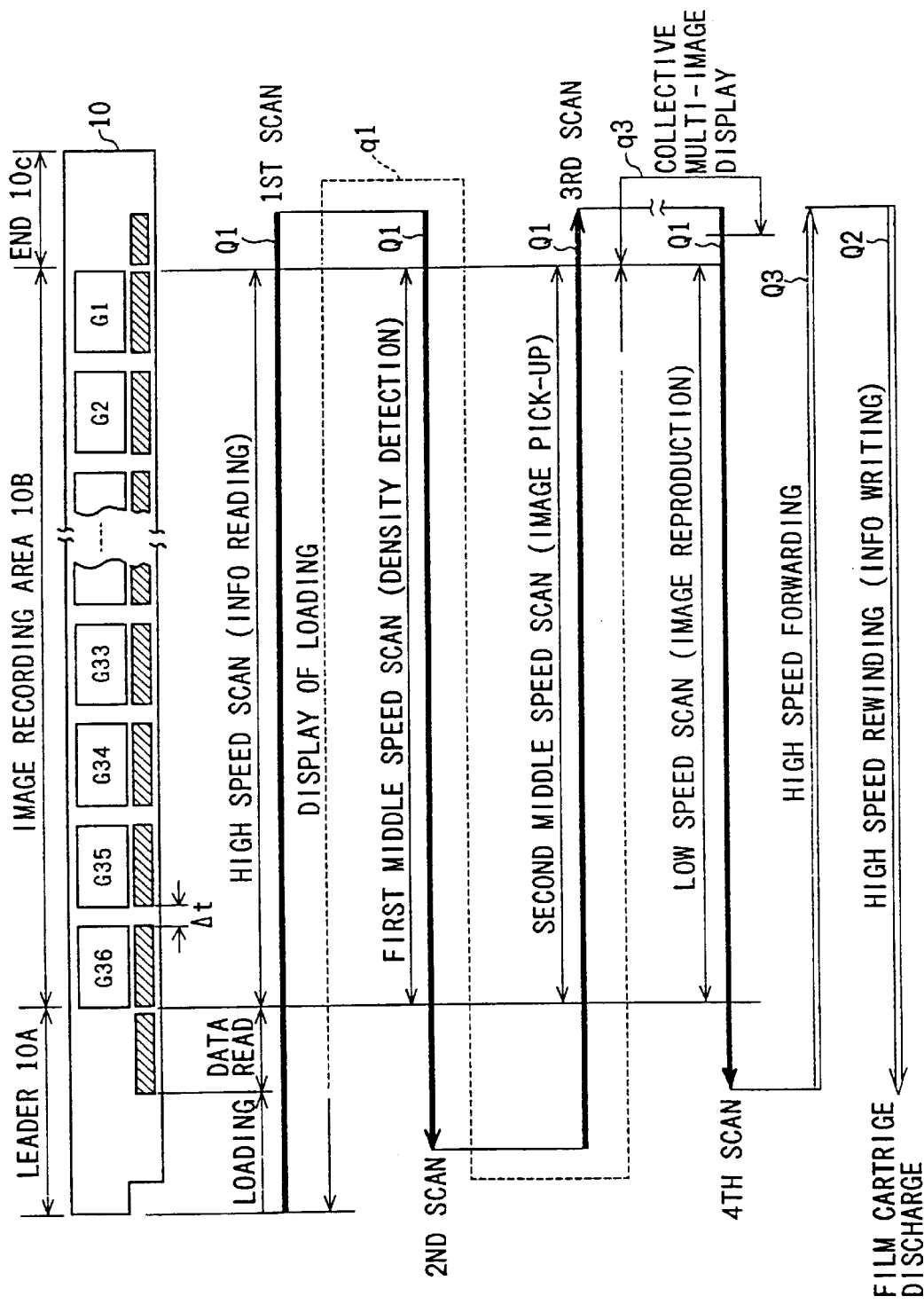
FIG. 23 is a chart summarily showing a fifth reading and recording manner which is adapted for reading magnetic information and reproducing film images of a backwardly recorded film.

FIG. 23 is a chart summarily showing a fifth reading and reproducing manner which is adapted for reading magnetic information and reproducing film images of a backwardly recorded film. In this manner, similarly to the fourth manner, there are provided two middle speeds, i.e., a first middle speed for the detecting of image density and a second middle speed for the picking up of film images for the multi-image.

Also, the collective multi-image display is executed after the third scanning, and the high speed forwarding is executed after the fourth scanning. The collective multi-image display is adopted in the following view: the sequential multi-image display is possible for the backwardly recorded film. However, in the backwardly recorded film, the display is executed from the last frame G36 to the first frame G1, which will give the operator a sense of incongruity.

Figure 24:
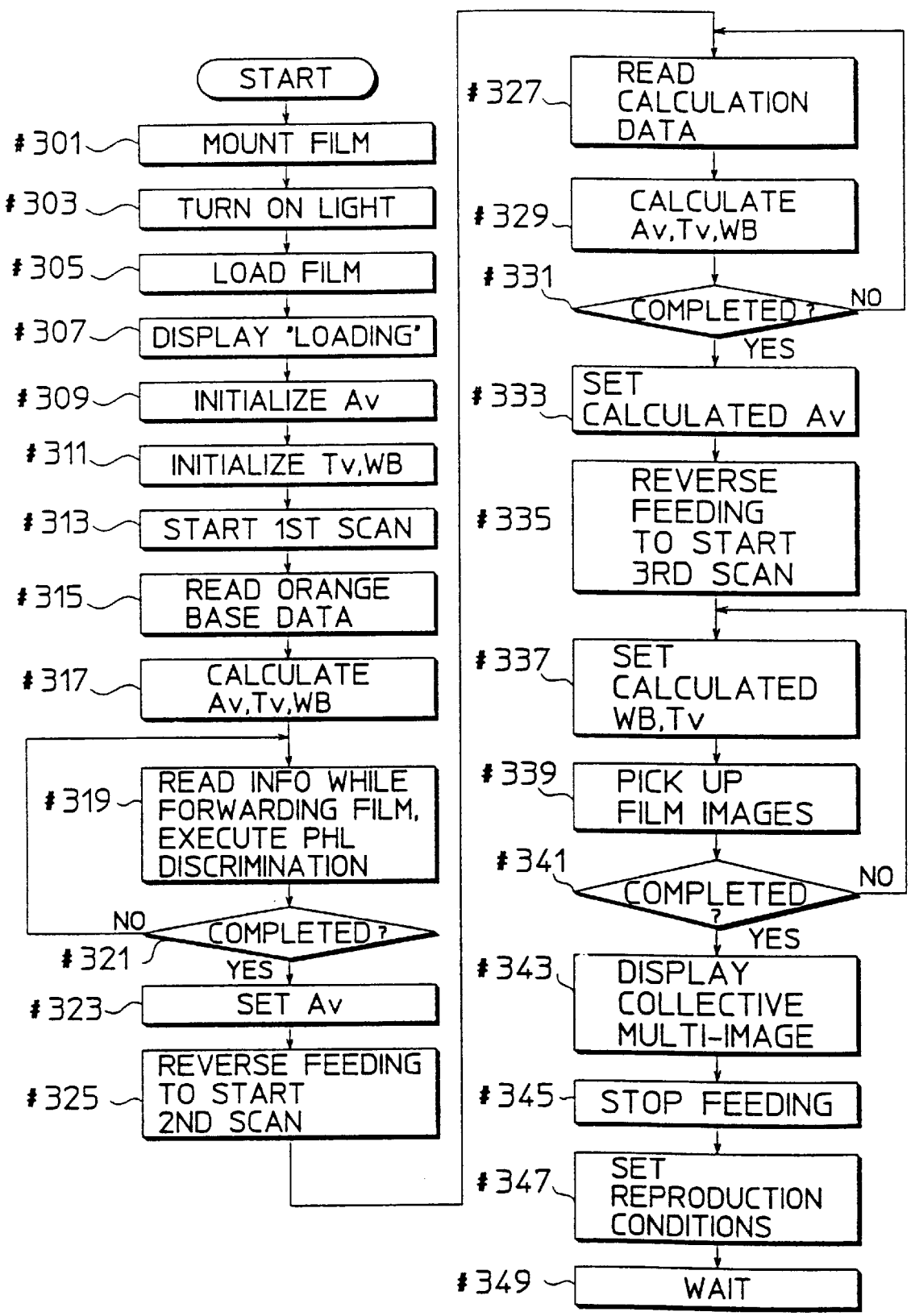
FIG. 24 is a flowchart showing operations of reading magnetic information of the backwardly recorded film in the fifth manner.

FIG. 24 is a flowchart of reading magnetic information in the fifth reading and reproducing manner. Operations of Steps #301 to #341, and #345 to #349 of this routine are basically identical to the operations of Steps #201 to #239, #243, #245, #255, and #257 of the fourth manner shown in FIG. 22. However, in place of the sequential multi-image display of Step #241, the collective multi-image display of Step #343 is provided after the completion of the third scanning (YES in Step #341). Also, the fifth manner does not need the operations which are executed in Steps #247 to #253 of the fourth manner.

The film 10 in the film cartridge 9 is mounted in the film loader and automatically loaded (Steps #301 to #307). Thereafter, the orange base data and the magnetic information are read during the first scanning (Steps #309 to 321). Subsequently, the iris 22 is driven to attain the aperture value Av calculated in Step #317 (Step #323), and the feeding direction of the film 10 is reversed to start the second scanning (Step #325).

The second scanning is executed at the first middle speed. Upon start of the second scanning, the exposure/color correction calculation data are read and the aperture value Av, electronic shutter speed Tv and WB correction value used to pick up the film images for the multi-image are calculated based on the read exposure/color correction calculation data (Steps #327 to #331).

When the exposure/color correction calculation data are read and the film images are picked up for all frames F (YES in Step #331), the iris 22 is driven to attain the aperture value Av calculated in Step #329 (Step #333), and the feeding direction of the film 10 is reversed to start the third scanning (Step #335). The third scanning is executed at the second middle speed.

Upon start of the third scanning, the WB correction value and the electronic shutter speed Tv are set to the respective value calculated in Step #329 (Step #337). Then, the film images for the multi-image are picked up while forwarding the film 10 at the second middle speed (Steps #339 to #341). After all the film images are picked up (YES in Step #341), the multi-image is generated from the picked up images of all the frames and is displayed on the display screen 3 of the monitor TV 2 (Step #343). The feeding of the film 10 is stopped (Step #345).

Thereafter, the operator is allowed to set the reproduction conditions such as a reproduction order of the respective frames F, posture conversion and clipping while viewing the multi-image on the display screen 3 (Step #347). These set values are stored in the internal memory and the reproducing operations of film images are waited (Step #349). The reproducing operations are identical to those of the second manner which are shown in FIG. 17B.

In the foregoing embodiment, the information is magnetically recorded on the film 10. However, it may be appreciated to optically record on the film 10 information which is not required to be rewritten.

Also, a line sensor is used as the image pick-up device in the foregoing embodiment. However, it may be possible to use an area sensor as the image pick-up device.

In the foregoing embodiment, further, the single image pick-up device is used for the film image picking up for generation of multi-image and for the film image picking up for reproduction of film image. However, it may be appreciated to provide two image pick-up devices for the film image picking up for generation of multi-image and for the film image picking up for reproduction of film image, respectively.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image reproducing apparatus comprising:

an image pick-up device which picks up images recorded on a developed film having an unexposed portion;

a detector which detects a density of said unexposed portion of the developed film; and an exposure controller which controls an exposure of the image pick-up device based on a detected density of said unexposed portion of the developed film.

2. An image reproducing apparatus according to claim 1, wherein the exposure controller includes:

a diaphragm provided between the image pick-up device and the developed film; and an exposure time changer which is operable to change the exposure time of the image pick-up device; and wherein at least one of the diaphragm and the exposure time changer is operated in accordance with a detected density of said unexposed portion.

3. An image reproducing apparatus according to claim 1, wherein the image pick-up device has a pre-scanning mode and a main scanning mode, said main scanning mode being executed after the pre-scanning mode; and wherein the exposure controller controls an exposure of the image pick-up device based on a detected density of said unexposed portion in the pre-scanning mode.

4. An image reproducing apparatus according to claim 1, wherein the image pick-up device includes an image sensor, and wherein the detector includes an image sensor.

5. An image reproducing apparatus according to claim 1, wherein the image pick-up device and the detector include a single common image sensor.

6. An image reproducing apparatus comprising:

an image pick-up device which picks up images recorded on a developed film having an unexposed portion;

a detector which detects a density of said unexposed portion of the developed film; and an image processor which executes an image processing, for an image picked up by the image pick-up device, based on a detected density of said unexposed portion of the developed film.

7. An image reproducing apparatus according to claim 6, wherein the image processing, executed by the image processor, is white balance control.

8. An image reproducing apparatus according to claim 6, wherein the image pick-up device has a pre-scanning mode and a main scanning mode, said main scanning mode being executed after the pre-scanning mode, and wherein the image processing, executed by the image processor, is for an image picked up in the pre-scanning mode.

9. An image reproducing apparatus according to claim 6, wherein the image pick-up device includes an image sensor, and wherein the detector includes an image sensor.

10. An image reproducing apparatus according to claim 6, wherein the image pick-up device and the detector include a single common image sensor.

11. An image reproducing apparatus comprising:

a first detector which detects a density of an unexposed portion of a developed film;

a second detector which detects a density of an exposed portion of the developed film and picks up images recorded on the exposed portion;

controller which controls the second detector based on a density detected by the first detector; and a reproducer which reproduces images picked up by the second detector.

12. An image reproducing apparatus according to claim 11, wherein the controller controls an exposure of the second detector.

13. An image reproducing apparatus according to claim 12, wherein the controller controls an image processing operation of the reproducer.

14. An image reproducing apparatus according to claim 11, wherein the reproducer reproduces a plurality of images in a multi-image form.

15. An image reproducing apparatus according to claim 14, wherein the second detector executes the detection of a density of the exposed portion and the picking up of images recorded on the exposed portion simultaneously.

16. An image reproducing apparatus according to claim 11, wherein the second detector detects respective densities of a plurality of separate locations in the exposed portion.

17. An image reproducing apparatus according to claim 11, wherein the first detector includes an image sensor, and wherein the second detector includes an image sensor.

18. An image reproducing apparatus according to claim 11, wherein the first and second detectors include a single common image sensor.

* * * * *